(12) United States Patent
Zhong et al.

(10) Patent No.: US 8,005,312 B2
(45) Date of Patent: *Aug. 23, 2011

(54) SYSTEM AND METHOD FOR IMPLEMENTING GRAPHICS AND VIDEO SCALING ALGORITHM USING INTERPOLATION BASED ON SYMMETRICAL POLYPHASE FILTERING

(75) Inventors: Sheng Zhong, San Jose, CA (US); Darren Neuman, Palo Alto, CA (US); Brian Schoner, Freemont, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/749,900

(22) Filed: Mar. 30, 2010

(65) Prior Publication Data
US 2010/0215284 A1    Aug. 26, 2010

Related U.S. Application Data

(63) Continuation of application No. 11/333,557, filed on Jan. 17, 2006, now Pat. No. 7,720,304.

(60) Provisional application No. 60/686,047, filed on May 31, 2005.

(51) Int. Cl.
  *G06K 9/54* (2006.01)
(52) U.S. Cl. ........................ 382/260; 382/300
(58) Field of Classification Search .......... 382/260, 382/268, 298, 300; 708/290, 313, 319; 700/94; 341/143; 345/204; 348/581; 375/340
See application file for complete search history.

(56) References Cited

U.S. PATENT DOCUMENTS

| | | | |
|---|---|---|---|
| 4,694,413 A | 9/1987 | Arbeiter | |
| 5,500,811 A | 3/1996 | Corry | |
| 6,035,186 A | 3/2000 | Moore et al. | |
| 6,611,260 B1 | 8/2003 | Greenberg et al. | |
| 6,757,343 B1 * | 6/2004 | Ortega et al. | 375/340 |
| 6,772,022 B1 | 8/2004 | Farrow et al. | |
| 6,876,319 B2 | 4/2005 | Webster et al. | |
| 7,391,933 B2 * | 6/2008 | Wang et al. | 382/300 |
| 7,515,766 B2 | 4/2009 | Kurupati et al. | |
| 2003/0103166 A1 | 6/2003 | MacInnis | |
| 2006/0224649 A1 | 10/2006 | Chiskis | |

* cited by examiner

*Primary Examiner* — Kanji Patel
(74) *Attorney, Agent, or Firm* — McAndrews, Held & Malloy, Ltd.

(57) ABSTRACT

A video processing system may implement a video scaling algorithm using interpolation based on polyphase filtering. A video or graphics scaler may be utilized to scale luma, chroma, and/or alpha information in a video image. The scaler may comprise a first polyphase sub-filtering with zero phase shift that generates an in-phase filtered output from an input video image and a second polyphase sub-filtering that generates an out-of-phase filtered output from the input video image. The video scaler may also comprise an interpolator that may generate a scaled video image based on the generated in-phase and out-of-phase filtered outputs and a scaling factor. The scaling factor may be determined based on an input video size (M) and a desired output video size (N). The interpolation of the generated in-phase and out-of-phase filtered outputs in the video scaler may be implemented by utilizing a Farrow structure.

21 Claims, 18 Drawing Sheets

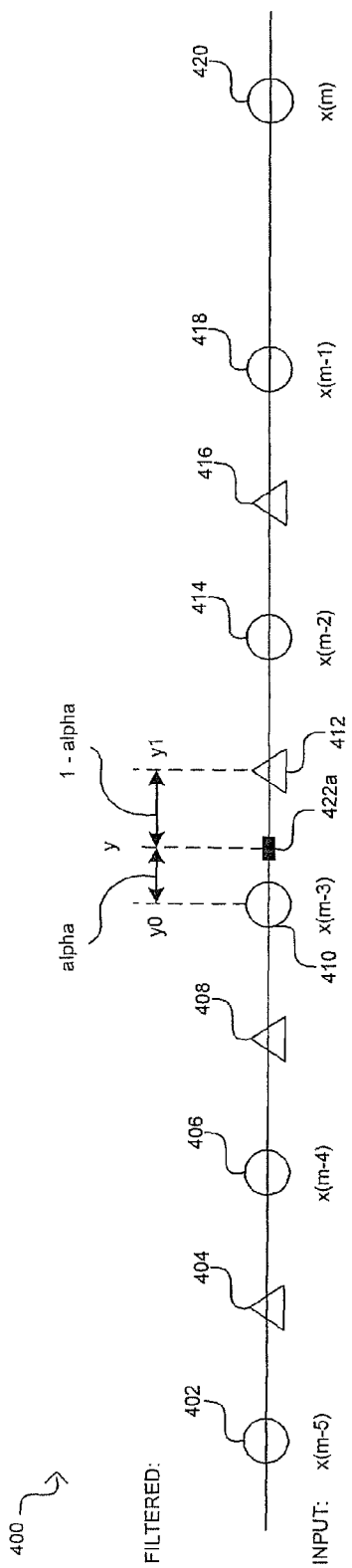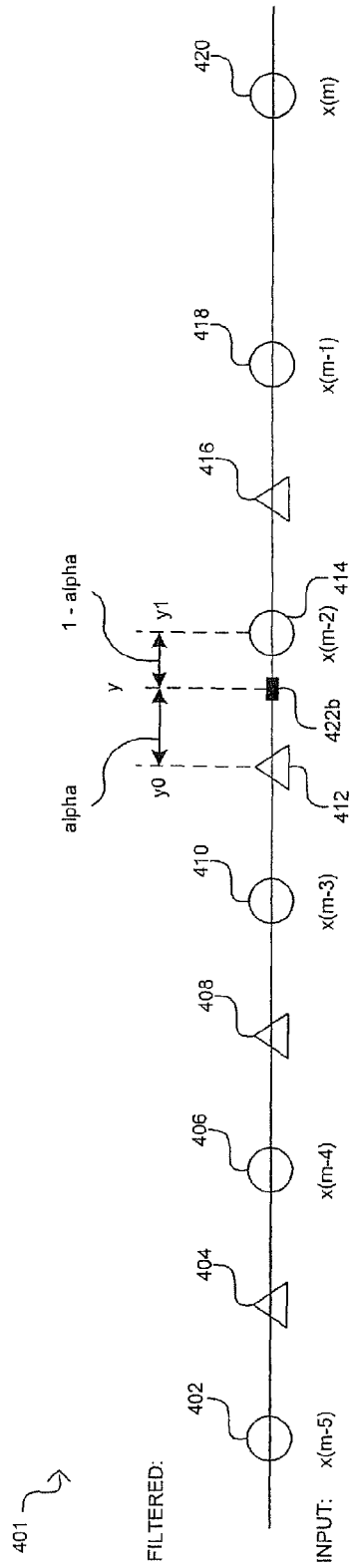

SYSTEM AND METHOD FOR IMPLEMENTING GRAPHICS AND VIDEO SCALING ALGORITHM USING INTERPOLATION BASED ON SYMMETRICAL POLYPHASE FILTERING

RELATED APPLICATIONS

This application is a continuation of U.S. patent application Ser. No. 11/333,557, filed Jan. 17, 2006; which makes reference to, claims priority to and claims benefit from U.S. Provisional Patent Application Ser. No. 60/686,047 filed on May 31, 2005.

The above referenced application is hereby incorporated herein by reference in its entirety.

FEDERALLY SPONSORED RESEARCH OR DEVELOPMENT

[Not Applicable]

MICROFICHE/COPYRIGHT REFERENCE

[Not Applicable]

FIELD OF THE INVENTION

Certain embodiments of the invention relate to video processing. More specifically, certain embodiments of the invention relate to a system and method for implementing graphics and a video scaling algorithm using interpolation based on symmetrical polyphase filtering.

BACKGROUND OF THE INVENTION

In video applications there may be a large number of video and/or graphic display formats that may be supported by many different vendors. These different video display formats may differ, at least in part, in their horizontal resolution, vertical resolution, and/or aspect ratio, for example. The selection of a particular video display format may depend on user and/or vendor specification. The use of a particular video display format may also be determined by standard specifications, for example. In order to enable system components that support one type of video display format to operate with system components that support a different type of video display format, video systems may utilize video or graphic scalers. Video scalers may be adapted to provide down scaling and/or up scaling operations.

A polyphase filter (PPF) may be utilized to perform filtering operations when implementing video and graphic scalers in video systems. Usually, a sub-filter with phase that is closest to the desired output sample is utilized to generate the output sample as an approximation. In order to mitigate approximation errors, the number of phases of the polyphase filter may need to be sufficiently large, generally resulting in an increase in system cost. Another approach may be to interpolate between two sub-phase filters in order to alleviate the phase accuracy limit of a PPF with a small number of phases such as 4 or 8 phases, for example. However, usually even with such an approach, the number of required multiplications may still be large, resulting in no effective reduction in system cost. Therefore, these kinds of algorithms and/or architectures, when utilized in video scalers, may still get quite large and may result in the use of a considerable amount of gates in silicon. Simplified methods of resolving this problem generally suffer from loss of scaling quality. Often, the resulting phase noise is visible and undesirable. Additionally, the size reduction that may be achieved is often not significant compared to the resultant undesirable effects.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for implementing graphics and a video scaling algorithm using interpolation based on symmetrical polyphase filtering, substantially as shown in and/or described in connection with at least one of the figures, as set forth more completely in the claims.

These and other features and advantages of the present invention may be appreciated from a review of the following detailed description of the present invention, along with the accompanying figures in which like reference numerals refer to like parts throughout.

BRIEF DESCRIPTION OF SEVERAL VIEWS OF THE DRAWINGS

FIG. 4A illustrates exemplary positions for in-phase, out-of-phase, and desired output sample in a video line when a desired output sample is between an in-phase sample and a following out-of-phase sample, in accordance with an embodiment of the present invention.

FIG. 4B illustrates exemplary positions for in-phase, out-of-phase, and desired output samples in a video line when a desired output sample is between an in-phase sample and a previous out-of-phase sample, in accordance with an embodiment of the present invention.

DETAILED DESCRIPTION OF THE INVENTION

Certain embodiments of the invention may be found in a system and method for implementing graphics and a video scaling algorithm using second-order interpolation based on symmetrical polyphase filtering. A video or graphics scaler may be utilized to scale luma, chroma, and/or alpha information in a video image. The scaler may comprise a first symmetric polyphase filter with zero phase shift that generates an in-phase filtered video image pixel and a second symmetric polyphase filter that generates an out-of-phase filtered video image pixel based on a scaling factor. The video scaler may also comprise an interpolator that generates a scaled video image pixel based on the generated in-phase and out-of-phase filtered video image pixels and a scaling factor. The scaling factor may be determined based on an input video size (M) and a desired output video size (N). The symmetric polyphase filters in the video scaler may be implemented by utilizing a Farrow structure. In the following discussion the terms "video" and "graphic" may be used interchangeably and may comprise still and or moving graphic or video images.

Figure 1:
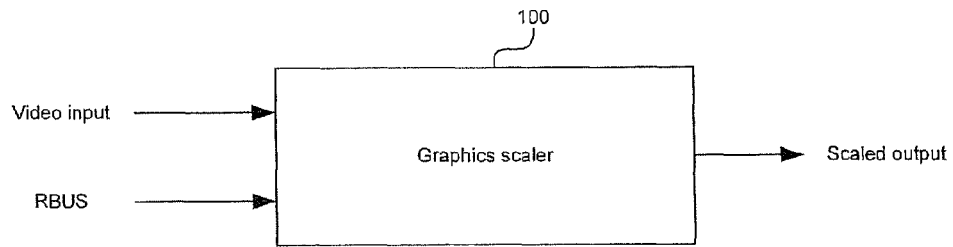
FIG. 1 is a block diagram illustrating an exemplary top-level diagram of a graphics scaler, in accordance with an embodiment of the invention.

FIG. 1 is a block diagram illustrating an exemplary top-level diagram of a graphics scaler, in accordance with an embodiment of the invention. Referring to FIG. 1, there is shown a graphics scaler 100 that may comprise suitable logic, circuitry, and/or code that may be adapted to scale a video input and generate a scaled output. The graphics scaler 100 may be adapted to provide horizontal scaling and/or vertical scaling operations on the video input. Moreover, the graphics scaler 100 may be adapted to provide up scaling and/or down scaling operations on the video input.

The graphics scaler 100 may be programmable and may be adapted to receive information via a bus, such as an RBUS, for example. In this regard, the RBUS may be utilized to transfer programming values and/or control data from a host processor to the graphics scaler 100. For example, the graphics scaler 100 may receive programmable filter coefficients, initial delay information, video source size, video destination size, scaling factor, and/or signals that may be utilized to bypass the graphics scaler 100 when appropriate and/or desirable. The graphics scaler 100 may be adapted to communicate with other components based on a ready/accept protocol, for example.

When implementing the graphics scaler 100, design specifications and/or requirements may comprise, but need not be limited to, information regarding picture size, pixel format, scaling capability, sampling position, coefficients programmability, operating target, and/or data flow model. For example, the picture size may specify a maximum and a minimum input and output picture sizes that may be supported by the scaler. The pixel format may indicate the input and output format pixel formats that may be supported such as alpha-YCrCb or alpha-RGB, for example. The scaling capability may indicate up scaling and/or down scaling ratios that may be supported. The sampling position may specify the nearest rounding of a pixel fraction that may be supported. In this regard, initial sampling positions may be programmable via the RBUS, for example. The coefficient's programmability may indicate the ability of the graphics scaler to update and/or modify filter coefficients during operation. Providing a set of registers in the graphics scaler 100 may support the programmability of the coefficient. The video rates that may be supported may be specified by the operating target requirements. The data flow model may be utilized to specify a data-pull model where the graphics scaler 100 may only be stalled by when its input is empty and/or its output is full, for example. A temporary stall may be allowed as long as the graphics scaler 100 may catch up with the required data rate. This characteristic may provide some elasticity in the data flow, which may help to prevent display artifacts.

Figure 2:
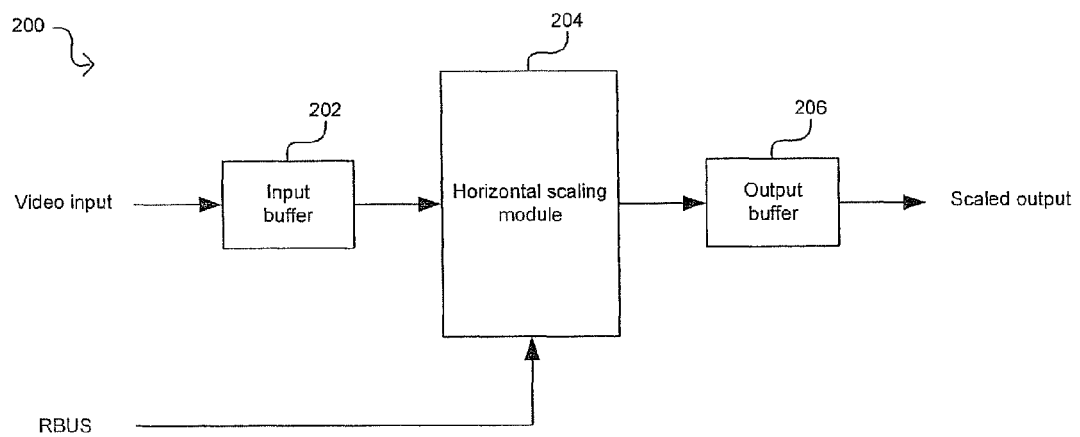
FIG. 2 is a block diagram illustrating an exemplary implementation of a graphics scaler, in accordance with an embodiment of the invention.

FIG. 2 is a block diagram illustrating an exemplary implementation of a graphics scaler, in accordance with an embodiment of the invention. Referring to FIG. 2, there is shown a graphics scaler 200 that comprises an input buffer 202, a horizontal scaling module 204, and an output buffer 206. The input buffer 202 may comprise suitable logic, circuitry, and/or code that may be adapted to smooth out bursts of data from the video input data flow to a more sustained and slower data flow that may be handled by the horizontal scaling module 204. In this regard, the input buffer 202 may increase the efficiency of the input datapath. In some instances, at least a portion of the operations of the input buffer 202 may be implemented in an output buffer in the horizontal scaling module 204.

The output buffer 206 may comprise suitable logic, circuitry, and/or code that may be adapted to accumulate scaled output data between memory services, for example. The output buffer 206 may also be utilized as a skid buffer in instances where the graphics scaler 200 is flow controlled at its output. The output buffer 206 may also be utilized to buffer output samples in order to avoid on-the-fly down scaling with large scaling ratios that would require more bandwidth. In some instances, at least a portion of the operations of the output buffer 206 may be implemented in an input buffer in the horizontal scaling module 204. In some down scaling operations the output buffer 206 may not be necessary.

The horizontal scaling module 204 may comprise suitable logic, circuitry, and/or code that may be adapted to scale video lines of the input video. The horizontal scaling module 204 may comprise a horizontal scaler for each video data channel supported, for example. In some instances, the video input may comprise, for example, four data channels that handle alpha, Y (luma), and Cb and Cr (chroma components) separately. In this instance, the horizontal scaling module 204 may comprise four horizontal scalers to perform scaling operations on each data channel separately. In other instances, the video input may comprise, for example, four data channels that handle alpha, R (red), G (green), and B (blue) separately. In either instance, the horizontal scaling module 204 may comprise four horizontal scalers to perform scaling operations on each data channel separately. When the video input comprises alpha, Y, Cr, and Cb channels, for example, the horizontal scaling module 204 may comprise a horizontal scaler for each of the Y, Cr, and Cb components of the video input and the alpha data.

Figure 3:
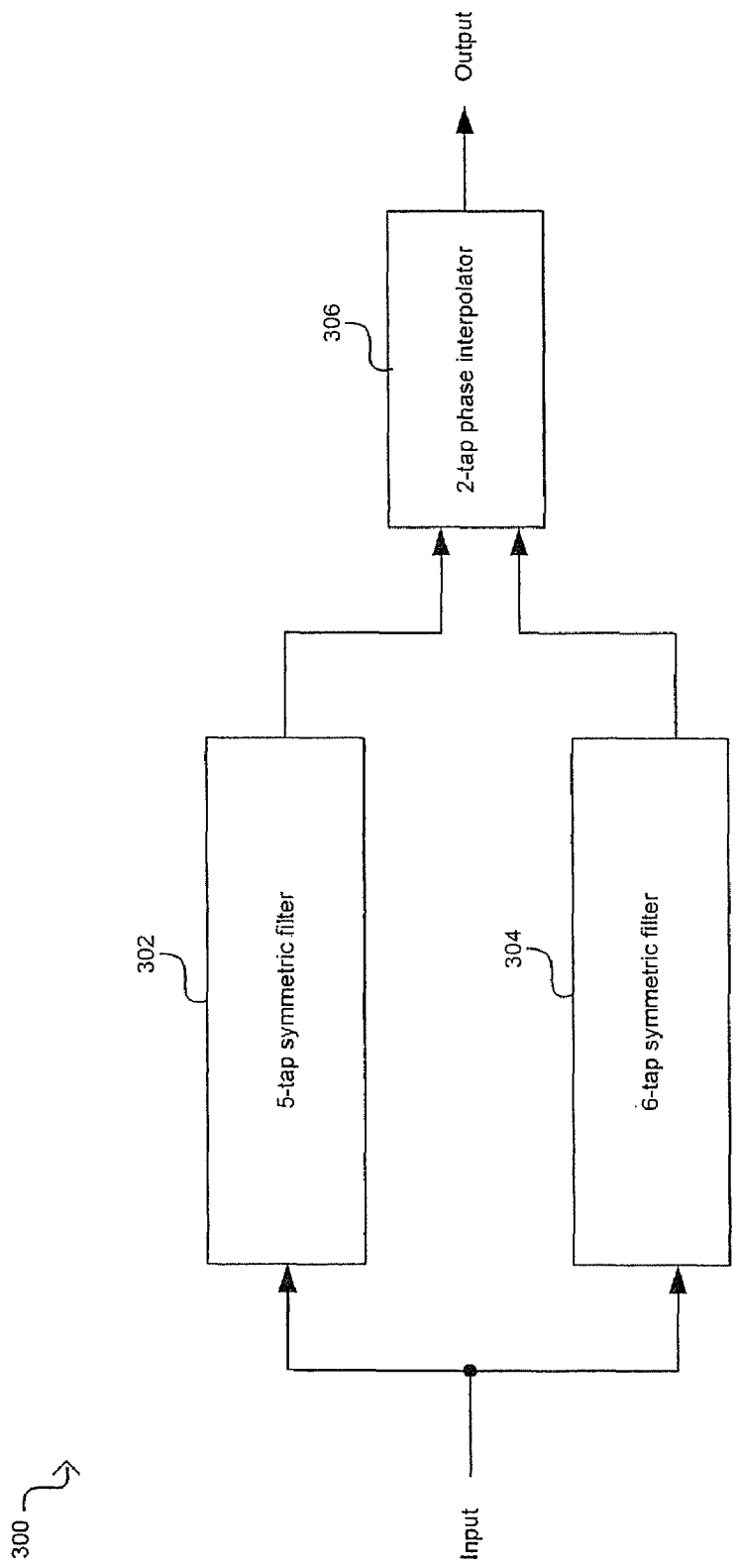
FIG. 3 is a block diagram illustrating an exemplary horizontal scaler, in accordance with an embodiment of the invention.

FIG. 3 is a block diagram illustrating an exemplary horizontal scaler, in accordance with an embodiment of the invention. Referring to FIG. 3, there is shown a horizontal scaler 300 that may comprise a first symmetric filter 302, a second symmetric filter 304, and an interpolator 306. A horizontal scaler 300 may be implemented for each of the data channels supported by the horizontal scaling module 204 in FIG. 2.

The first symmetric filter 302 and the second symmetric filter 304 may be utilized to implement, for example, a 2-phase-6-tap polyphase filter (PPF). In this regard, the first symmetric filter 302 may correspond to an in-phase or PHASE 0 filtering of the 2-phase 6-tap PPF while the second symmetric filter 304 may correspond to an out-of-phase or PHASE 1 filtering of the 2-phase-6-tap PPF. The PPF filtering coefficients of the 2-phase-6-tap PPF may be $c_{00}$, $c_{01}$, $c_{02}$, $c_{03}$, $c_{04}$, and $c_{05}$ for PHASE 0 filtering and $c_{10}$, $c_{11}$, $c_{12}$, $c_{13}$, $c_{14}$, and $c_{15}$ for PHASE 1 filtering. In order to have both phases be symmetrical and PHASE 0 provide a zero phase-shift, with the integer multiple of whole-pixel delay being excluded, the PPF filtering coefficients of the 2-phase-6-tap PPF may be $c_{00}$, $c_{01}$, $c_{02}$, $c_{01}$, $c_{00}$, and 0 for PHASE 0 filtering and $c_{10}$, $c_{11}$, $c_{12}$, $c_{12}$, $c_{11}$, and $c_{10}$ for PHASE 1 filtering. In this regard, six registers may be utilized to store the PPF filtering coefficients of the 2-phase-6-tap PPF. The PPF filtering coefficients may be programmable via the RBUS, for example.

The first symmetric filter 302 may comprise suitable logic, circuitry, and/or code that may be adapted to perform in-phase or PHASE 0 filtering. In this regard, the first symmetric filter 302 may be implemented as a 5-tap PPF that utilizes the PPF filtering coefficients $c_{00}$, $c_{01}$, $c_{02}$, $c_{01}$, $c_{00}$, and 0. The first symmetric filter 302 may support interpolation to half-pixel precision, for example. The first symmetric filter 302 may receive the data channel input and may generate a first filtered output that may be transferred to the interpolator 306.

The second symmetric filter 304 may comprise suitable logic, circuitry, and/or code that may be adapted to perform out-of-phase or PHASE 1 filtering. In this regard, the second symmetric filter 304 may be implemented as a 6-tap PPF that that utilizes the PPF filtering coefficients $c_{10}$, $c_{11}$, $c_{12}$, $c_{12}$, $c_{11}$, and $c_{10}$. The second symmetric filter 304 may support interpolation to half-pixel precision, for example. The second symmetric filter 304 may receive the data channel input and may generate a second filtered output that may be transferred to the interpolator 306. The first and second filtered outputs may have twice the data rate as the data channel input with samples located at each input sample phase and between each sample phase.

The interpolator 306 may comprise suitable logic, circuitry, and/or code that may be adapted to receive the first filtered output from the first symmetric filter 302 and the second filtered output from the second symmetric filter 304 and generate a scaled output for the corresponding data channel. The interpolator 306 may support 1/64 sub-sample interpolation that may result in a scaled output with 1/128 sub-sample precision, for example.

FIG. 4A illustrates exemplary positions for in-phase, out-of-phase, and desired output samples in a video line when a desired output sample is between an in-phase sample and a following out-of-phase sample, in accordance with an embodiment of the present invention. Referring to FIG. 4A, there is shown a timing diagram 400 illustrating in-phase samples 402, 406, 410, 414, 418, and 420, out-of-phase samples 404, 408, 412, and 416, and desired output sample 422a. The in-phase samples correspond to time instances $X(mT1)=x(m)$, where T1 is the input sample period. For example, in-phase sample 420 corresponds to time instance $x(m)$. The first symmetric filter 302 may generate the in-phase samples 402, 406, 410, 414, 418, and 420, for example. The second symmetric filter 304 may generate the out-of-phase samples 404, 408, 412, and 416, for example. The interpolator 306 may generate the desired output sample 422a, for example.

When determining the desired output sample 422a between a first filtered output, $y_0$, corresponding to the in-phase sample 410, and a second filtered output, corresponding to the immediately following out-of-phase sample 412, the following expressions may be utilized:

$$y_0 = c_{00}^* x(m-5) + c_{01}^* x(m-4) + c_{02}^* x(m-3) + \\ c_{01}^* x(m-2) + c_{00}^* x(m-1) \\ = c_{00}^*(x(m-5) + x(m-1)) + c_{01}^* \binom{x(m-4)+}{(m-2)} + \\ c_{02}^* x(m-3), \quad (1)$$

and $$y_1 = c_{10}^* x(m-5) + c_{11}^* x(m-4) + c_{12}^* x(m-3) + \\ c_{12}^* x(m-2) + c_{11}^* x(m-1) + c_{10}^* x(m) \\ = c_{10}^*(x(m-5) + x(m)) + c_{11}^*(x(m-4) + x(m-1)) + \\ c_{12}^*(x(m-3) + x(m-2)). \quad (2)$$

The desired output sample 422a may be determined by the interpolator 306 by performing, for example, a linear interpolation between the value of the first filtered output, $y_0$, as expressed by equation (1) and the value of the second filtered output, $y_1$, as expressed by equation (2). The value of the desired output sample 422a may be given by the following expression:

$$y(n) = (1-\text{alpha})^* y_0 + \text{alpha}^* y_1 = y_0 + \text{alpha}^*(y_1 - y_0) \quad (3)$$

where alpha is the normalized temporal distance between the in-phase sample 410 and the desired output sample 422a, and the desired output samples correspond to time instances $Y(nT2)=y(n)$, where T2 is the output sample period.

FIG. 4B illustrates exemplary positions for in-phase, out-of-phase, and desired output samples in a video line when a desired output sample is between an in-phase sample and a previous out-of-phase sample, in accordance with an embodiment of the present invention. Referring to FIG. 4B, there is shown a timing diagram 401 illustrating in-phase samples 402, 406, 410, 414, 418, and 420, out-of-phase samples 404, 408, 412, and 416, and desired output sample 422b. The first symmetric filter 302 may generate the in-phase samples 402, 406, 410, 414, 418, and 420, for example. The second symmetric filter 304 may generate the out-of-phase samples 404, 408, 412, and 416, for example. The interpolator 306 may generate the desired output sample 422b, for example.

When determining the desired output sample 422b between a second filtered output, $y_1$, corresponding to the in-phase sample 414, and a first filtered output, $y_0$, corresponding to the immediately previous out-of-phase sample 412, the following expressions may be utilized:

$$y_0 = c_{10}^* x(m-5) + c_{11}^* x(m-4) + c_{12}^* x(m-3) + \qquad (4)$$
$$c_{12}^* x(m-2) + c_{11}^* x(m-1) + c_{10}^* x(m)$$
$$= c_{10}^*(x(m-5) + x(m)) + c_{11}^*(x(m-4) + x(m-1)) +$$
$$c_{12}^*(x(m-3) + x(m-2)),$$

and $$y_1 = c_{00}^* x(m-4) + c_{01}^* x(m-3) + c_{02}^* x(m-2) + \qquad (5)$$
$$c_{01}^* x(m-1) + c_{00}^* x(m)$$
$$= c_{00}^*(x(m-4) + x(m)) + c_{01}^*(x(m-3) + x(m-1)) +$$
$$c_{02}^* x(m-2).$$

The desired output sample 422b may be determined by the interpolator 306 by performing, for example, a linear interpolation between the value of the first filtered output, $y_0$, as expressed by equation (4) and the value of the second filtered output, $y_1$, as expressed by equation (5). The value of the desired output sample 422b may be given by the following expression:

$$y(n) = (1-\text{alpha})^* y_0 + \text{alpha}^* y_1 = y_0 + \text{alpha}^*(y_1 - y_0) \qquad (6)$$

where alpha is the normalized temporal distance between the out-of-phase sample 412 and the desired output sample 422b. In this regard, the operations in equation (3) and equation (6) are the same.

Figure 5A:
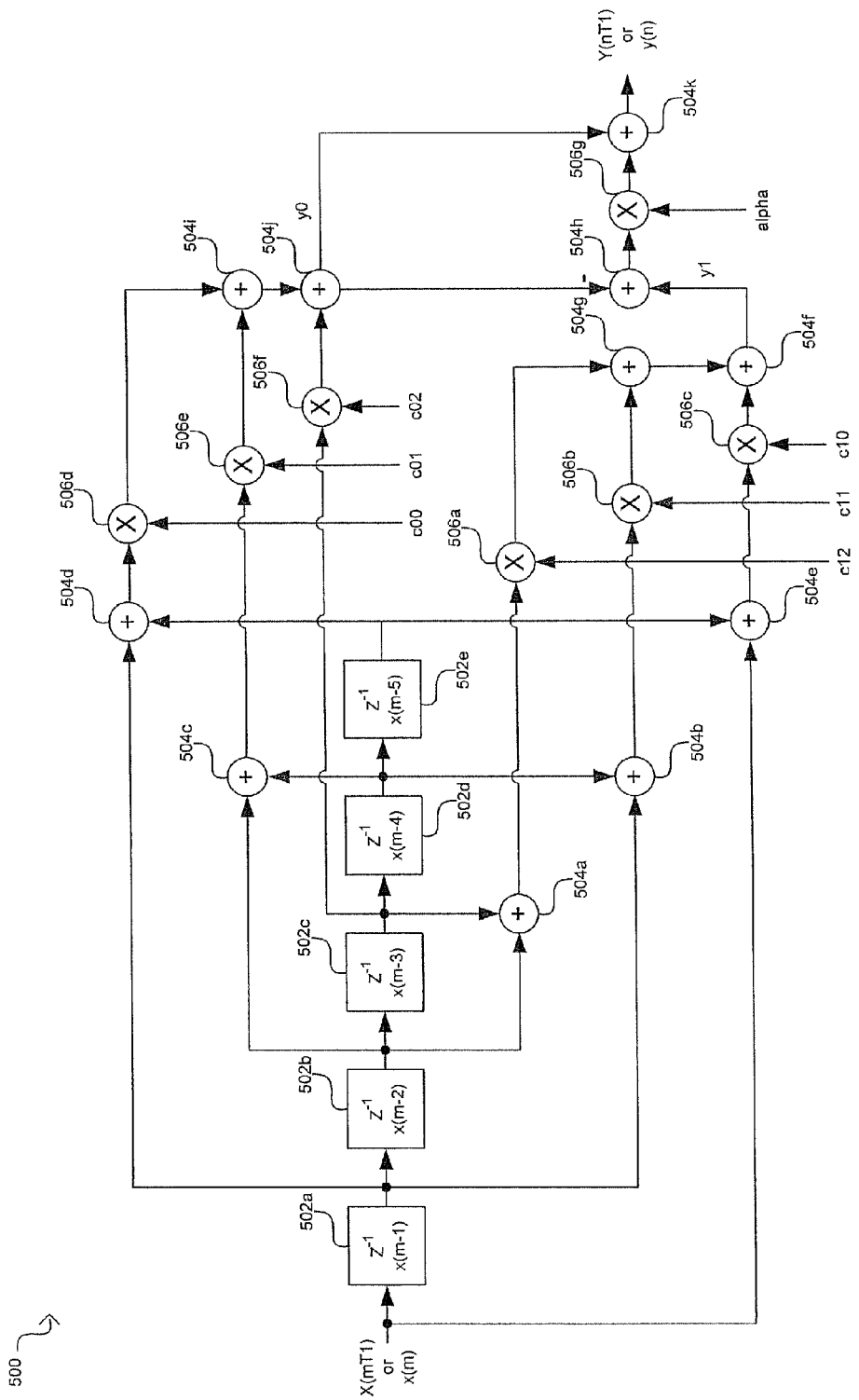
FIG. 5A is a block diagram illustrating an exemplary Farrow structure implementation of the filtering operations as described in FIG. 4A, in accordance with an embodiment of the invention.

FIG. 5A is a block diagram illustrating an exemplary Farrow structure implementation of the filtering operations as described in FIG. 4A, in accordance with an embodiment of the invention. Referring to FIG. 5A, there is shown a horizontal scaler 500 that implements the operations as described in equation (1), equation (2), and equation (3) by utilizing a Farrow structure. The horizontal scaler 500 may comprise delay blocks 502a, . . . , 502e, adders 504a, . . . , 504k, and multipliers 506a, . . . , 506g. The delay blocks 502a, . . . , 502e may comprise suitable logic, circuitry, and/or code that may be adapted to provide a digital delay corresponding to the input time period T1. The adders 504a, . . . , 504k may comprise suitable logic, circuitry, and/or code that may be adapted to add two digital values. The adder 504h may be adapted to perform subtraction by adding the negative value of one digital input to the remaining digital input. The multipliers 506a, . . . , 506g may comprise suitable logic, circuitry, and/or code that may be adapted to multiply two digital values.

In operation, the video line may be delayed by the delay blocks 502a, . . . , 502e to generate, for example, the in-phase samples 402, 406, 410, 414, and 418 in FIG. 4A. The in-phase sample 420 in FIG. 4A may correspond to the input of the horizontal scaler 500 in FIG. 5A. The PPF filtering coefficients $c_{00}$, $c_{01}$, and $c_{02}$ may be multiplied by the appropriate outputs of the delay blocks 502a, . . . , 502e by utilizing the adders 504c and 504d and the multipliers 506d, 506e, and 506f. The value of the first filtered output, $y_0$, in equation (1) may be generated by utilizing the adders 504i and 504j to add the outputs of the multipliers 506d, 506e, and 506f.

The PPF filtering coefficients $c_{10}$, $c_{11}$, and $c_{12}$ may be multiplied by the appropriate outputs of the delay blocks 502a, . . . , 502e and the input to the horizontal scaler 500 by utilizing the adders 504a, 504b, and 504e and the multipliers 506a, 506b, and 506c. The value of the second filtered output, $y_1$, in equation (2) may be generated by utilizing the adders 504f and 504g to add the outputs of the multipliers 506a, 506b, and 506c.

The desired output sample, $y(n)$, in equation (3) may be generated based on the first filtered output, $y_0$, and the second filtered output, $y_1$, by utilizing the adders 504h and 504k and the multiplier 506g. In this regard, the multiplier 506g may be utilized to introduce the normalized temporal distance alpha into the linear interpolation operation.

Figure 5B:
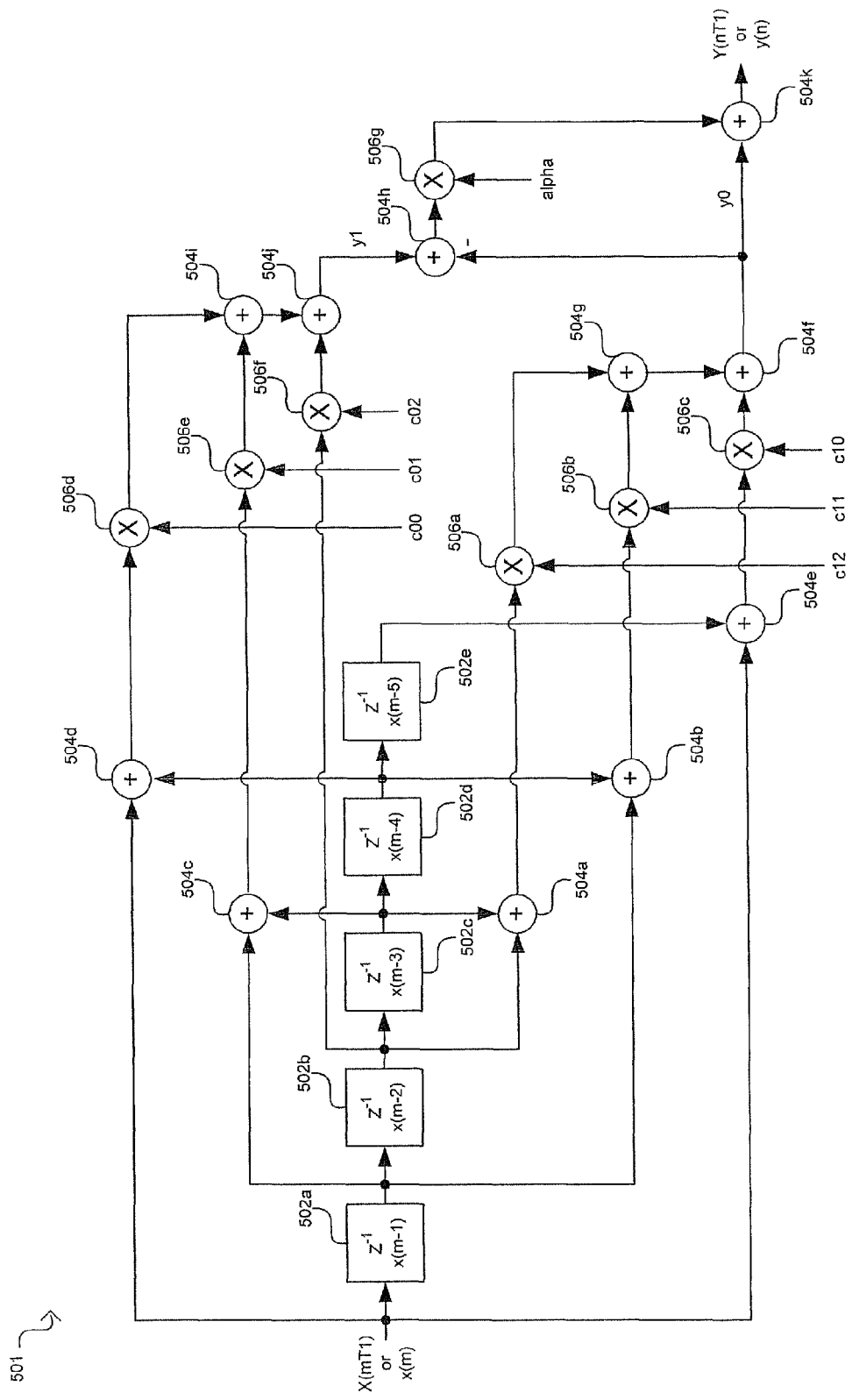
FIG. 5B is a block diagram illustrating an exemplary Farrow structure implementation of the filtering operations as described in FIG. 4B, in accordance with an embodiment of the invention.

FIG. 5B is a block diagram illustrating an exemplary Farrow structure implementation of the filtering operations as described in FIG. 4B, in accordance with an embodiment of the invention. Referring to FIG. 5B, there is shown a horizontal scaler 501 that implements the operations as described in equation (4), equation (5), and equation (6) by utilizing a Farrow structure. The horizontal scaler 501 may comprise delay blocks 502a, . . . , 502e, adders 504a, . . . , 504k, and multipliers 506a, . . . , 506g. The delay blocks 502a, . . . , 502e may comprise suitable logic, circuitry, and/or code that may be adapted to provide a digital delay corresponding to the input time period T1. The adders 504a, . . . , 504k may comprise suitable logic, circuitry, and/or code that may be adapted to add two digital values. The adder 504h may be adapted to perform subtraction by adding the negative value of one digital input to the remaining digital input. The multipliers 506a, . . . , 506g may comprise suitable logic, circuitry, and/or code that may be adapted to multiply two digital values.

In operation, the video line may be delayed by the delay blocks 502a, . . . , 502e to generate, for example, the in-phase samples 402, 406, 410, 414, and 418 in FIG. 4B. The in-phase sample 420 in FIG. 4B may correspond to the input of the horizontal scaler 501 in FIG. 5B. The PPF filtering coefficients $c_{00}$, $c_{01}$, and $c_{02}$ may be multiplied by the appropriate outputs of the delay blocks 502a, . . . , 502d and the input to the horizontal scaler 501 by utilizing the adders 504c and 504d and the multipliers 506d, 506e, and 506f. The value of the second filtered output, $y_1$, in equation (5) may be generated by utilizing the adders 504i and 504j to add the outputs of the multipliers 506d, 506e, and 506f.

The PPF filtering coefficients $c_{10}$, $c_{11}$, and $c_{12}$ may be multiplied by the appropriate outputs of the delay blocks 502a, . . . , 502e and the input to the horizontal scaler 501 by utilizing the adders 504a, 504b, and 504e and the multipliers 506a, 506b, and 506c. The value of the first filtered output, $y_0$, in equation (4) may be generated by utilizing the adders 504f and 504g to add the outputs of the multipliers 506a, 506b, and 506c.

The desired output sample, $y(n)$, in equation (6) may be generated based on the first filtered output, $y_0$, and the second filtered output, $y_1$, by utilizing the adders 504h and 504k and the multiplier 506g. In this regard, the multiplier 506g may be utilized to introduce the normalized temporal distance alpha into the linear interpolation operation.

Figure 6:
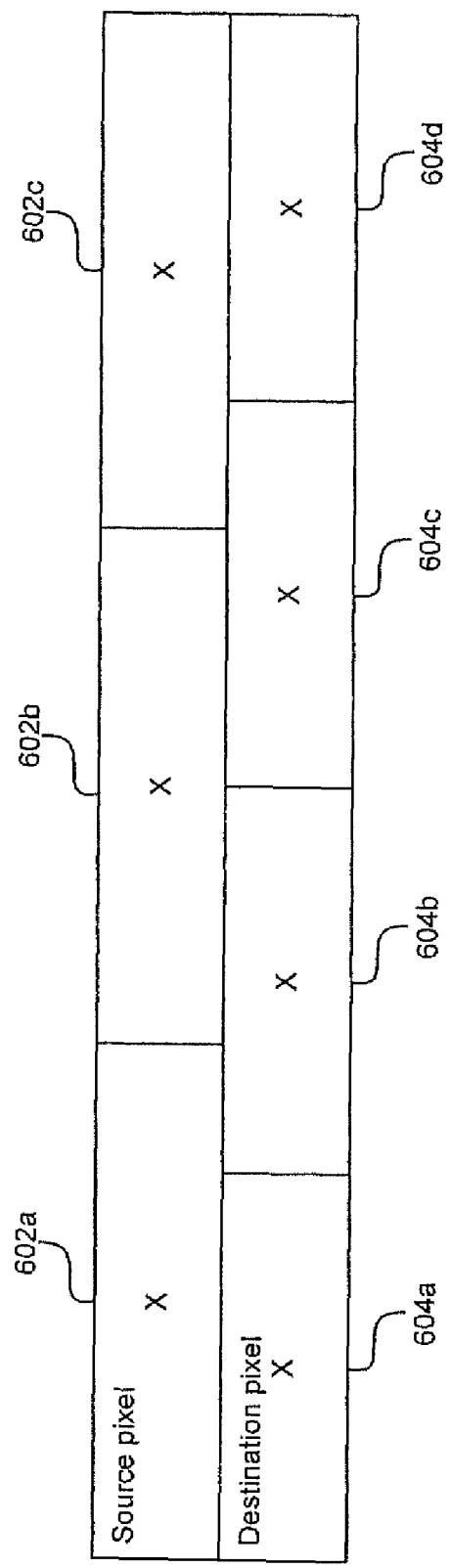
FIG. 6 illustrates an exemplary initial offset when the source is scaled by a scaling factor, S, in accordance with an embodiment of the present invention.

FIG. 6 illustrates an exemplary initial offset when the source is scaled by a factor of S, in accordance with an embodiment of the present invention. Referring to FIG. 6, there is shown an input or source video line comprising pixels 602a, 602b, and 602c and a scaled output video line comprising pixels 604a, 604b, 604c, and 604d. When the source is scaled by a scaling factor, S, the first pixel in the scaled output video line, pixel 604a, may be offset by (S−1)/2 input sample units relative to the first pixel in the input video line, pixel 602a, where S=M/N is the ratio of the input or source video line size (M) and the destination or desired output video line size (N).

When the output sampling frequency is 2*pi/T2 and input sampling frequency is 2*pi/T1, the source and destination picture sizes may be associated in proportion to the sampling frequencies, for example. In this regard, the input sample that corresponds to the n$^{th}$ output sample at sampling time nT2 may be given by the following expression:

$$t_1(n)=n*T2/T1+d=n*M/N+d=n*S+d \quad (7)$$

where d corresponds to an initial delay value. The value of $t_1$ corresponds to an accumulator with increment S for every output sample with an initial pre-loaded value of d so that $t_1(0)=d$. In this regard, equation (7) may be expressed as $$t_1(n)=t_1(n-1)+S, \text{ for } n>0. \quad (8)$$

The input sample $t_1(n)$ may be expressed in terms of an integer portion, i, and a remainder portion, r. The integer portion and the remainder may be given by the following expressions:

$$i=\text{int}[t_1(n)], \text{ and} \quad (9)$$

$$r=t_1(n)-i, \quad (10)$$

where the value of r is non-negative. The corresponding input sample for the filtering operations may be decided by the following expression $$m=i+3. \quad (11)$$

The above process of determining i may be denoted as a function of n by the following expression:

$$i=f(n). \quad (12)$$

Based on this approach, the input sample X(mT1) to the horizontal scaler and the five consecutive delay samples generated by the delay blocks 502a, . . . , 502e in FIGS. 5A-5B may be utilized to generate the out-of-phase samples 404, 408, 412, and 416 in FIGS. 4A-4B. In this regard, when r<0.5, where r is determined by equation (10), the five consecutive delayed samples generated by the delay blocks 502a, . . . , 502e may be utilized to generate the in-phase samples in FIG. 4A. When r≧0.5, the input sample X(mT1) or x(m) to the horizontal scaler and the next four consecutive delayed samples generated by the delay blocks 502a, . . . , 502d may be utilized to generate the in-phase samples in FIG. 4B. The value of the normalized temporal distance, alpha, may given by:

$$\text{alpha}=2*r, \text{ when } r<0.5, \text{ or} \quad (13)$$

$$\text{alpha}=2*(r-0.5), \text{ when } r≧0.5. \quad (14)$$

Figure 7A:
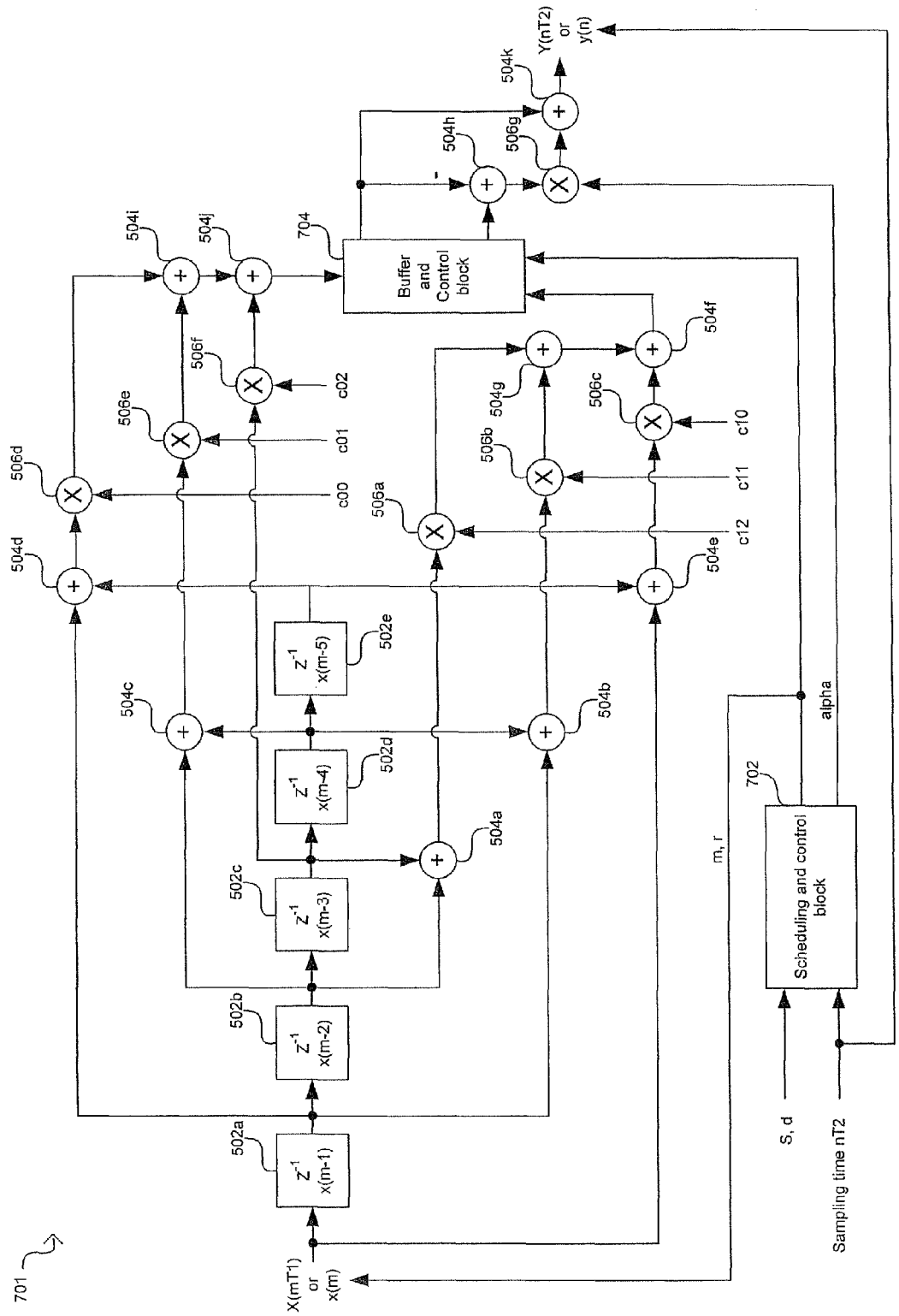
FIG. 7A is a block diagram illustrating an exemplary implementation of a horizontal scaler, in accordance with an embodiment of the invention.

FIG. 7A is a block diagram illustrating an exemplary implementation of a horizontal scaler, in accordance with an embodiment of the invention. Referring to FIG. 7A, there is shown a horizontal scaler 701 that may comprise delay blocks 502a, . . . , 502e, adders 504a, . . . , 504k, multipliers 506a, . . . , 506g, a scheduling and control block 702, and a buffer and control block 704. The delay blocks 502a, . . . , 502e, the adders 504a, . . . , 504k, and the multipliers 506a, . . . , 506g may be substantially as described in FIG. 5A. The scheduling and control block 702 may comprise suitable logic, circuitry, and/or code that may be adapted to receive the scaling factor, S, the initial delay value, d, and the sampling time nT2, and generate the normalized temporal distance, alpha, the remainder, r, and the input sample time instance, m.

The buffer and control block 704 may comprise suitable logic, circuitry, and/or code that may be adapted to provide values for the first filtered output, $y_0$, and the second filtered output, $y_1$, for a current interpolation operation. In this regard, the buffer and control block 704 may utilize the outputs of the adders 504j and 504f and the m and r values provided by the scheduling and control block 502. Moreover, the buffer and control block 704 may buffer at least a portion of previously determined values of the first filtered output, $y_0$, and the second filtered output, $y_1$. The buffer and control block 704 may select the appropriate buffered values to use for subsequent interpolation operations. The use of the scheduling and control block 702 and the buffer and control block 704 enables a pipelining filtering operation. The ready/accept protocol implemented as part of the graphics scaler 100 in FIG. 1 may be utilized to control the data flow in the horizontal scaler 701.

Figure 7B:
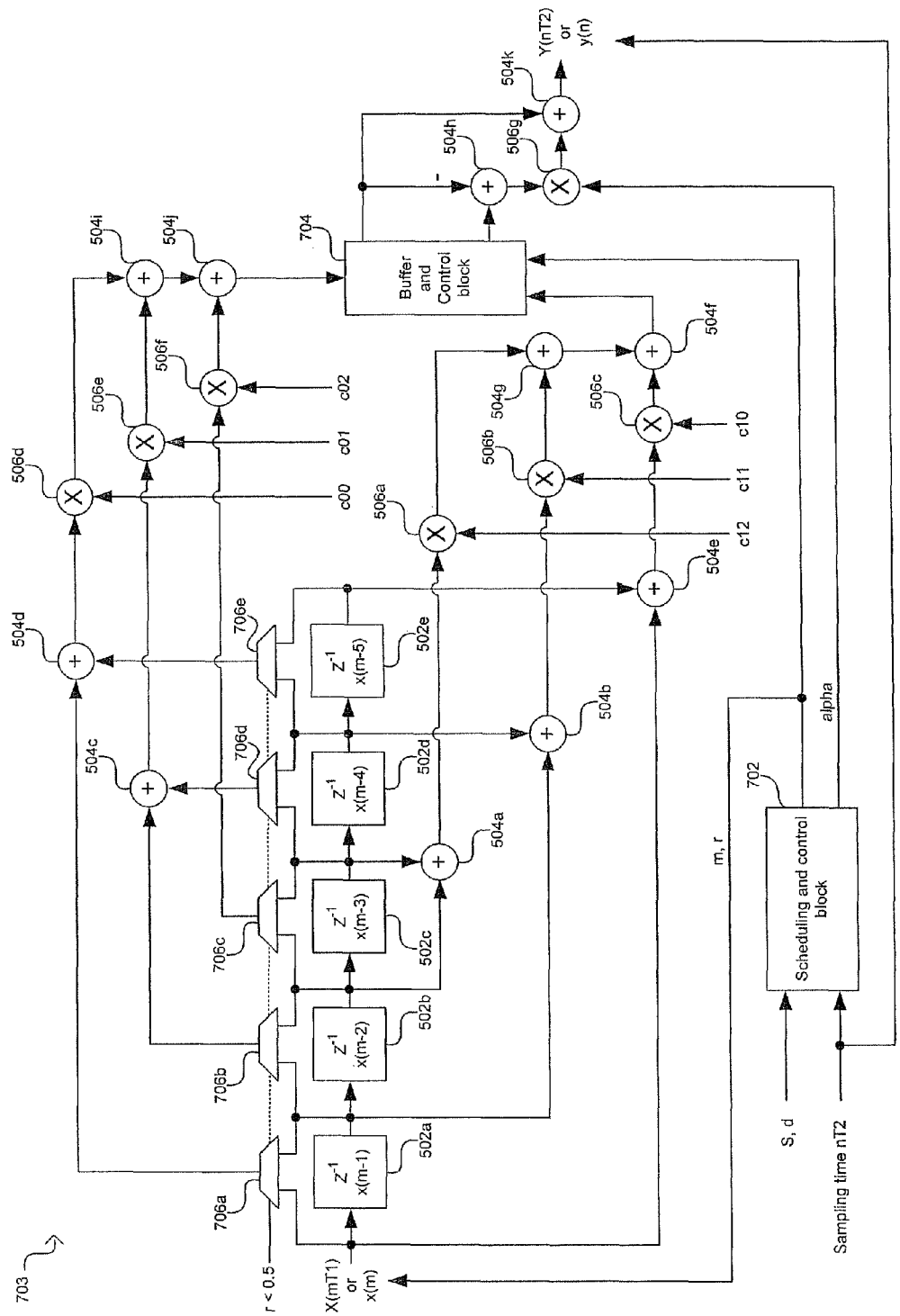
FIG. 7B is a block diagram illustrating an exemplary implementation of a horizontal scaler with interpolation point selectivity, in accordance with an embodiment of the invention.

FIG. 7B is a block diagram illustrating an exemplary implementation of a horizontal scaler with interpolation point selectivity, in accordance with an embodiment of the invention. Referring to FIG. 7B, there is shown a horizontal scaler 703 that may comprise delay blocks 502a, . . . , 502e, adders 504a, . . . , 504k, multipliers 506a, . . . , 506g, a scheduling and control block 702, a buffer and control block 704, and multiplexers 706a, . . . , 706e. The delay blocks 502a, . . . , 502e, the adders 504a, . . . , 504k, and the multipliers 506a, . . . , 506g may be substantially as described in FIG. 5A, and the scheduling and control block 702 and the buffer and control block 704 be substantially as described in FIG. 7A. The multiplexers 706a, . . . , 706e may comprise suitable logic, circuitry, and/or code that may be adapted to select from two delayed values based on the remainder, r. For example, multiplexer 706a may select between the input X(mT1) to the horizontal scaler 703 and the output of the delay 502a to be transferred to the adder 504d. When r≧0.5, the input X(mT1) may be selected. When r<0.5, the output of the delay 502a may be selected.

The architecture provided by the horizontal scaler 703 may enable the efficient calculation of a desired output sample regardless of the interpolation position. The remainder, r, may be utilized to select the interpolation point and the interpolation may be pipelined with the filtering operation by the scheduling and control block 702 and the buffer and control block 704. The ready/accept protocol implemented as part of the graphics scaler 100 may be utilized to control the data flow in the horizontal scaler 703.

Figure 8A:
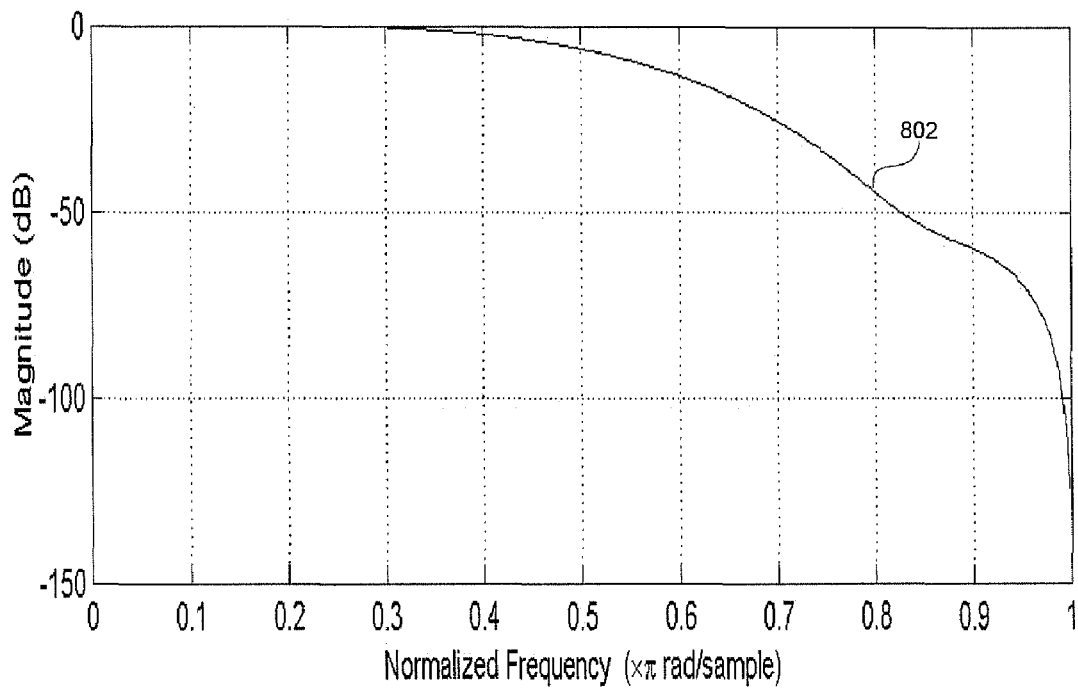
FIGS. 8A-8B illustrate exemplary magnitude and phase filter responses for a graphics scale-up operation, in accordance with an embodiment of the invention.
Figure 8B:
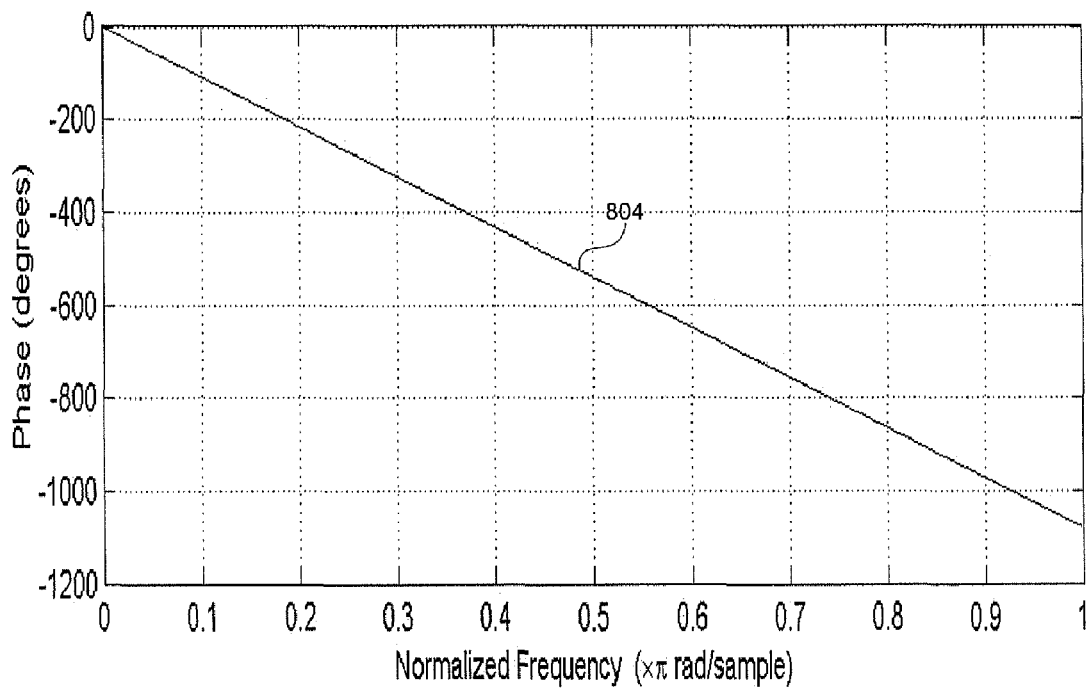

FIGS. 8A-8B illustrate exemplary magnitude and phase filter responses for a graphics scale-up operation, in accordance with an embodiment of the invention. Referring to FIGS. 8A-8B, there are shown a signal 802 and a signal 804, with frequency normalized to the Nyquist frequency, that correspond to the amplitude and phase responses respectively of a 2-phase-6-tap PPF utilized for scaling up operations. The symmetric PPF filtering coefficients utilized in this example are [0 0 256]/256 and [4 −27 151]/256. The response shown indicates a certain level of undershooting and overshooting.

Figure 9A:
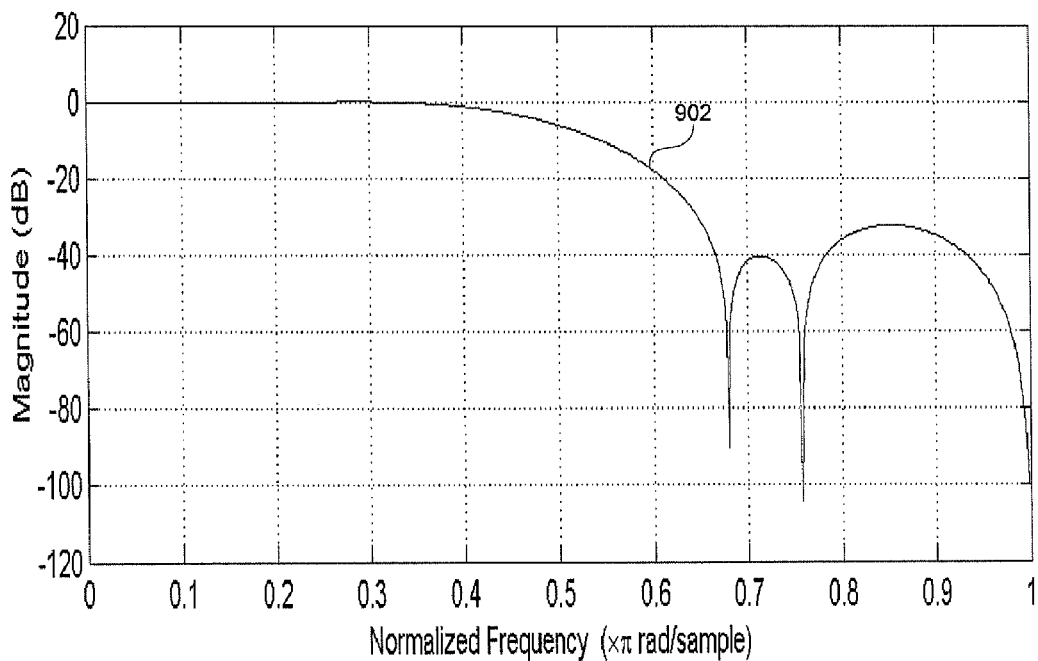
FIGS. 9A-9B illustrate exemplary magnitude and phase filter responses for a graphics scale-up operation, in accordance with an embodiment of the invention.
Figure 9B:
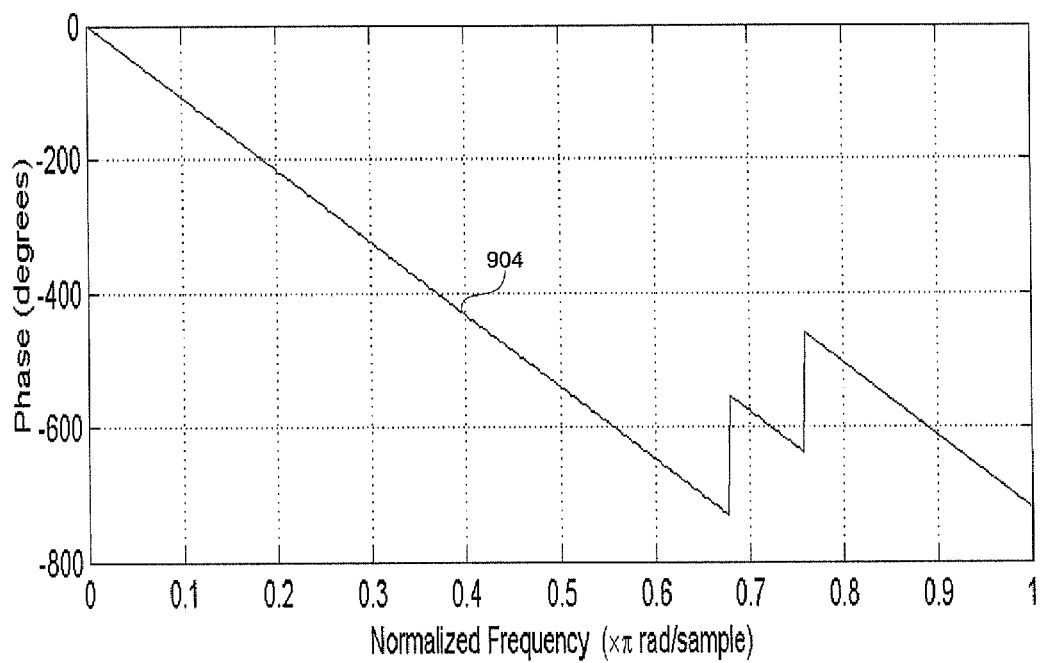

FIGS. 9A-9B illustrate exemplary magnitude and phase filter responses for a graphics scale-up operation, in accordance with an embodiment of the invention. Referring to FIGS. 9A-9B, there are shown a signal 902 and a signal 904, with frequency normalized to the Nyquist frequency, that correspond to the amplitude and phase responses respectively of a 2-phase-6-tap PPF utilized for scaling up operations. The symmetric PPF filtering coefficients utilized in this example are [0 0 256]/256 and [14 −41 155]/256. The response shown indicates a narrower transition band and may result in an improved image rejection. The signal 902 may show some slight passband ripples (<0.2 dB) and slightly less attenuation in the stop band than signal 802 in FIG. 8A, for example.

Figure 10A:
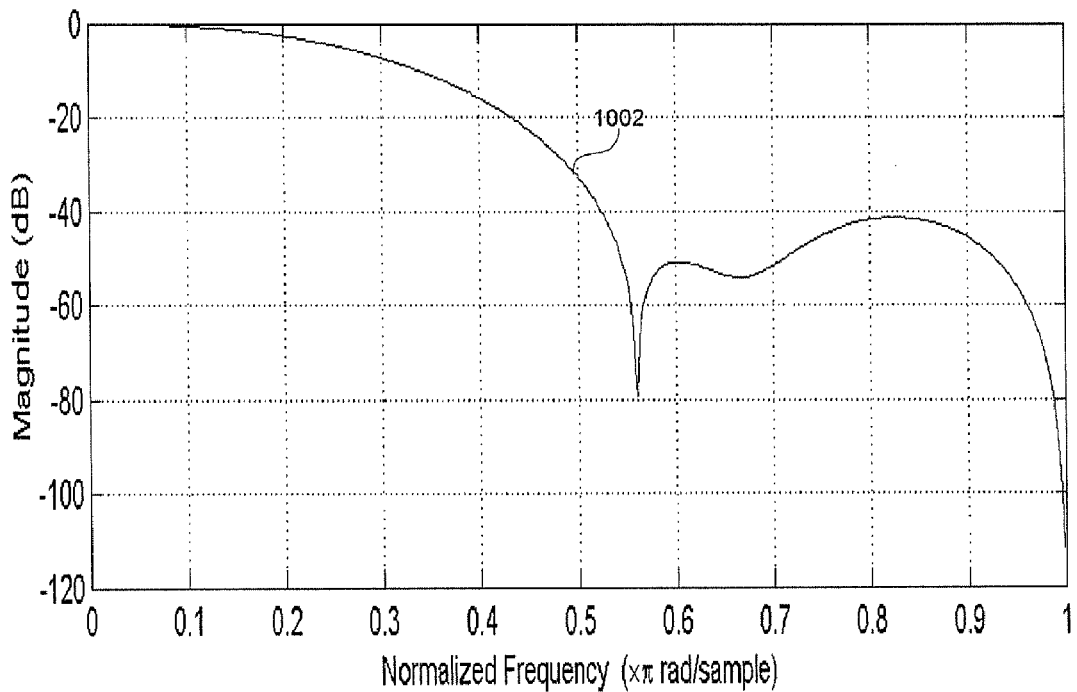
FIGS. 10A-10B illustrate exemplary magnitude and phase filter responses for a graphics 16:9 scale-down operation, in accordance with an embodiment of the invention.
Figure 10B:
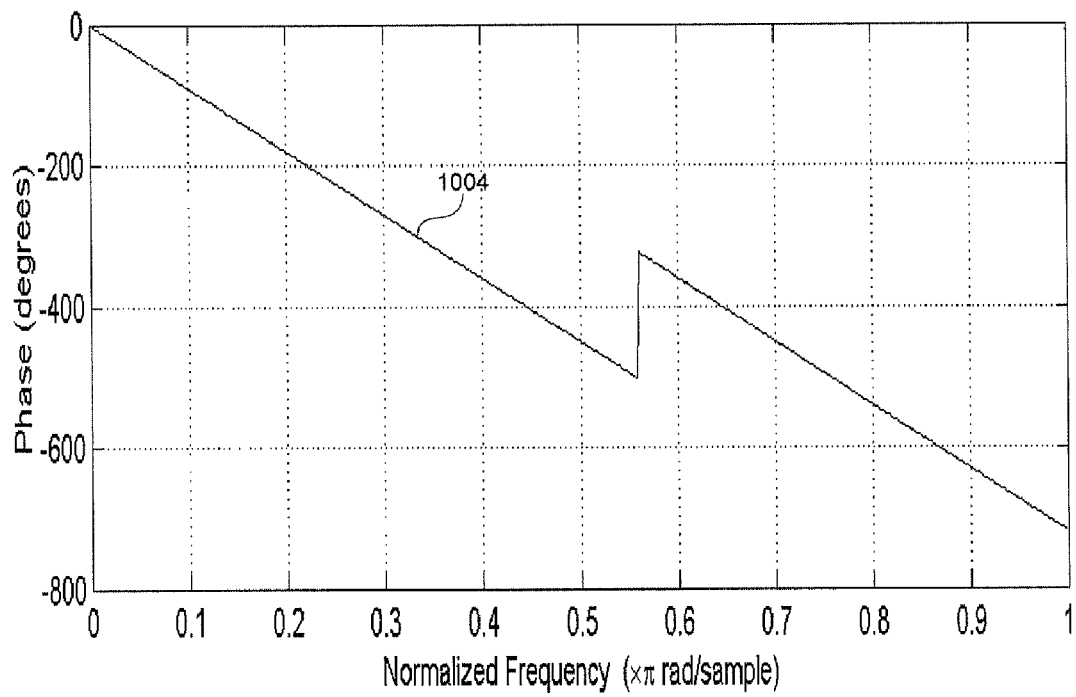

FIGS. 10A-10B illustrate exemplary magnitude and phase filter responses for a graphics 16:9 scale-down operation, in accordance with an embodiment of the invention. Referring to FIGS. 10A-10B, there are shown a signal 1002 and a signal 1004, with frequency normalized to the Nyquist frequency, that correspond to the amplitude and phase responses respectively of a 2-phase-6-tap PPF utilized for 16:9 down scaling operations. The symmetric PPF filtering coefficients utilized in this example are [−4 61 142]/256 and [−4 14 118]/256. The response shown indicates subdued overshooting/undershooting and nearly without ripples in the pass-band region.

Figure 11A:
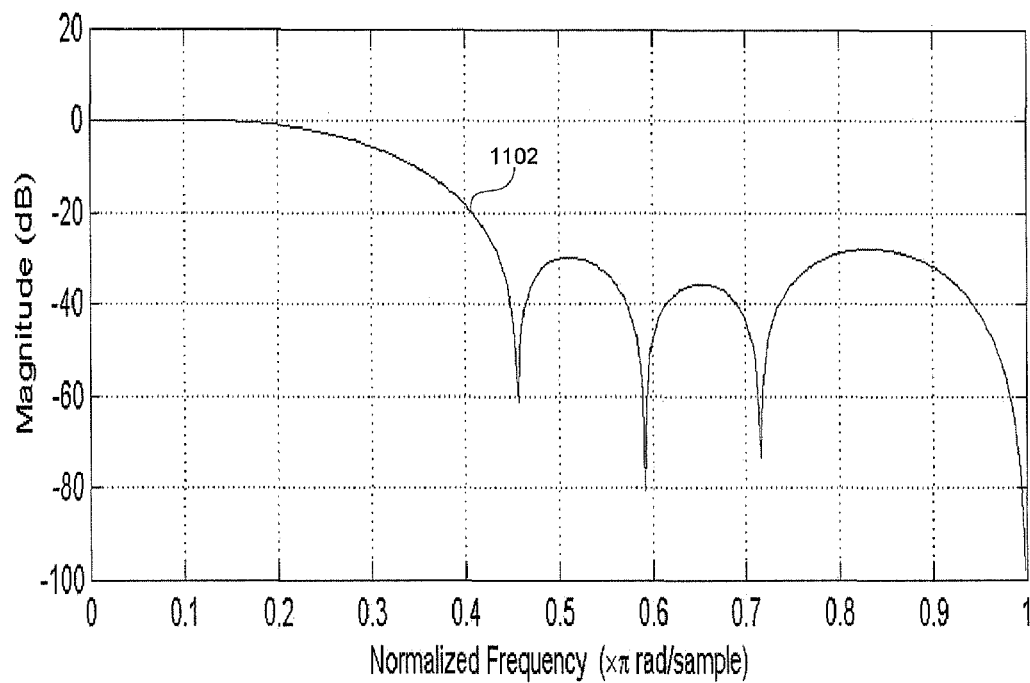
FIGS. 11A-11B illustrate exemplary magnitude and phase filter responses for a graphics 16:9 scale-down operation, in accordance with an embodiment of the invention.
Figure 11B:
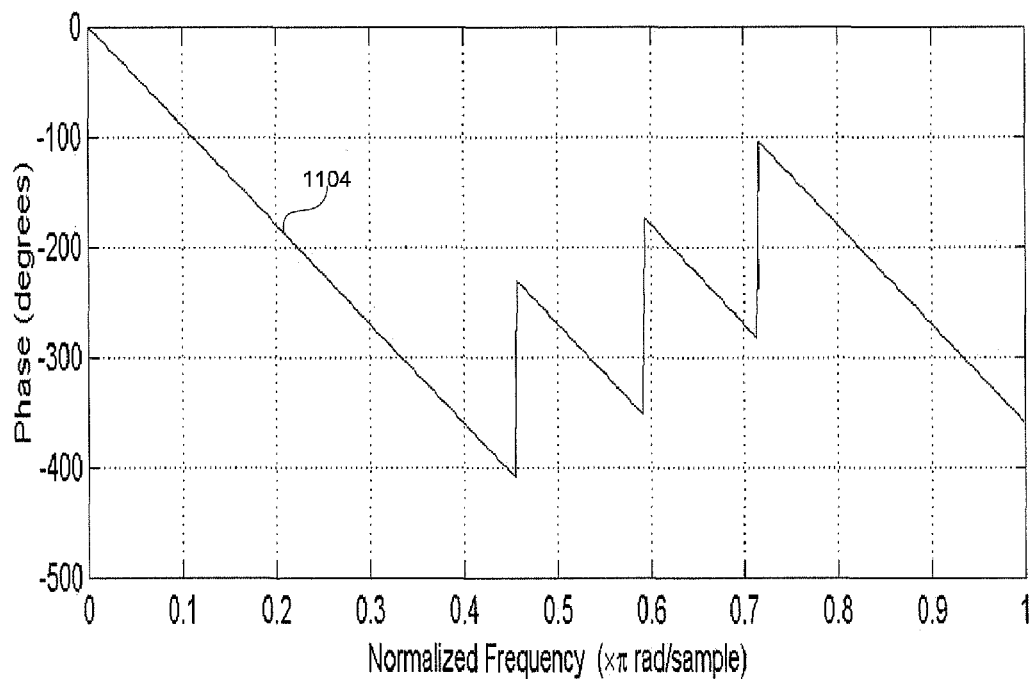

FIGS. 11A-11B illustrate exemplary magnitude and phase filter responses for a graphics 16:9 scale-down operation, in accordance with an embodiment of the invention. Referring to FIGS. 11A-11B, there are shown a signal 1102 and a signal 1104, with frequency normalized to the Nyquist frequency, that correspond to the amplitude and phase responses respectively of a 2-phase-6-tap PPF utilized for 16:9 down scaling operations. The symmetric PPF filtering coefficients utilized in this example are [−16 68 152]/256 and [−16 12 132]/256. The response shown indicates subdued overshooting/undershooting and nearly without ripples in the pass-band region. With the ringing artifact being less objectionable in down scaling, a filter with sharper transition may be favorable.

Figure 12A:
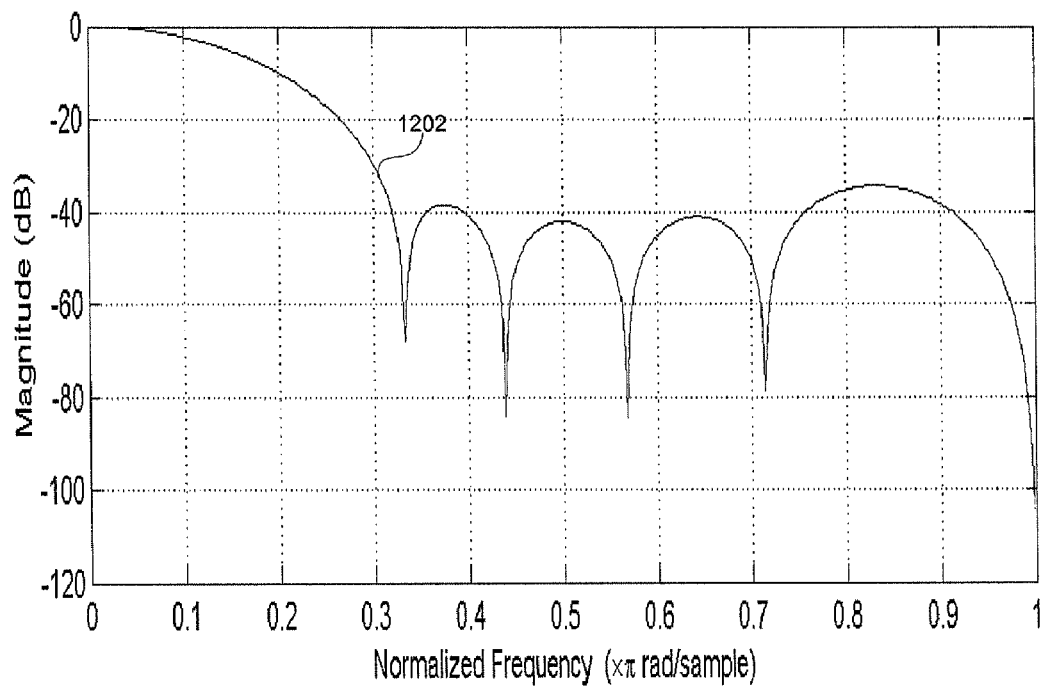
FIGS. 12A-12B illustrate exemplary magnitude and phase filter responses for a graphics 3:1 scale-down operation, in accordance with an embodiment of the invention.
Figure 12B:
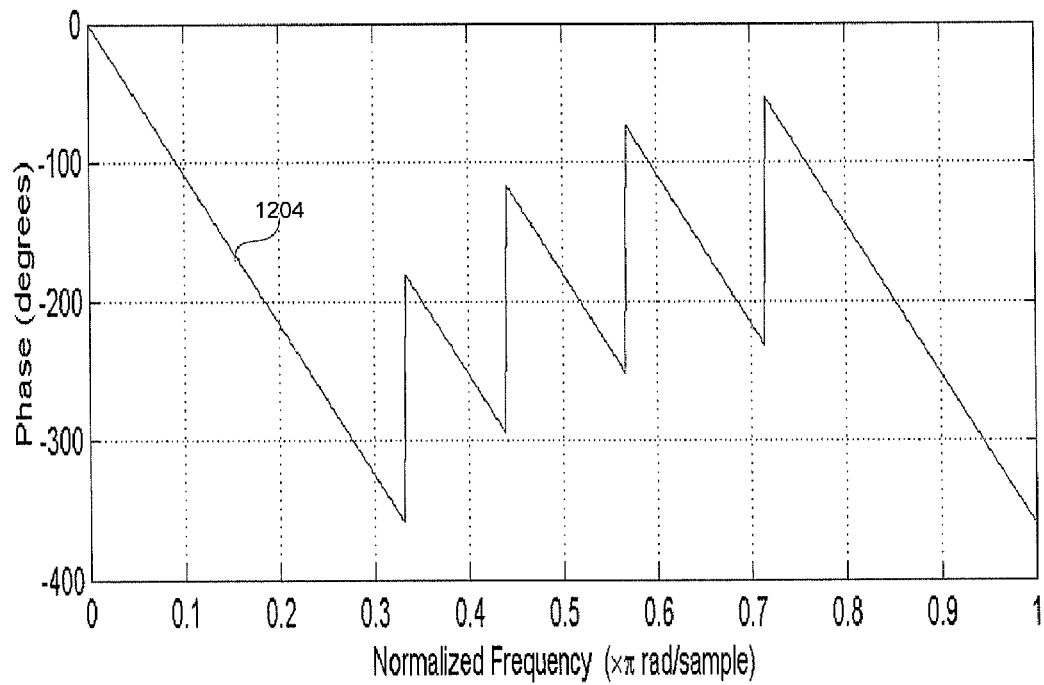

FIGS. 12A-12B illustrate exemplary magnitude and phase filter responses for a graphics 3:1 scale-down operation, in accordance with an embodiment of the invention. Referring to FIGS. 12A-12B, there are shown a signal 1202 and a signal 1204, with frequency normalized to the Nyquist frequency, that correspond to the amplitude and phase responses respectively of a 2-phase-6-tap PPF utilized for 3:1 down scaling operations. The symmetric PPF filtering coefficients utilized in this example are [23 63 84]/256 and [10 42 76]/256. The response shown indicates good anti-aliasing performance.

Figure 13A:
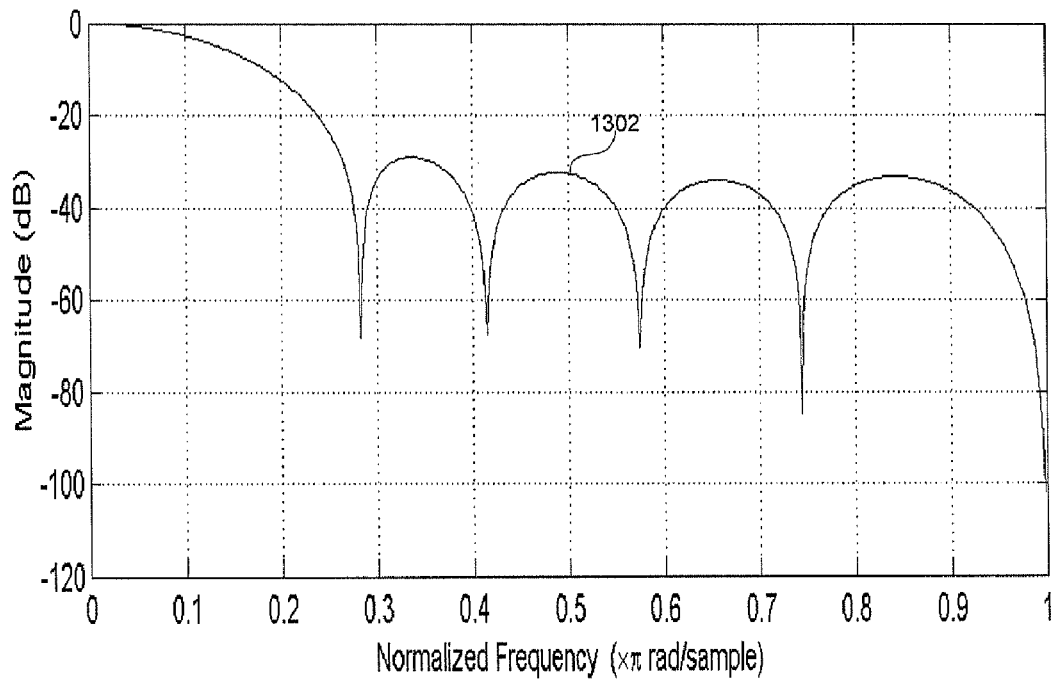
FIGS. 13A-13B illustrate exemplary magnitude and phase filter responses for a graphics 4:1 scale-down operation, in accordance with an embodiment of the invention.
Figure 13B:
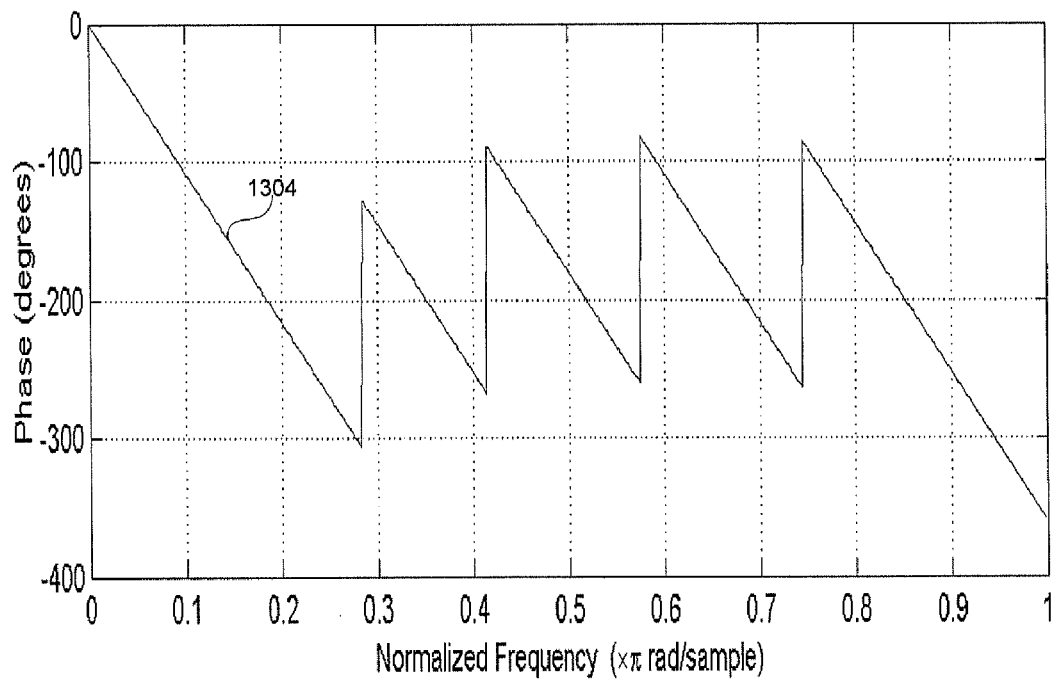

FIGS. 13A-13B illustrate exemplary magnitude and phase filter responses for a graphics 4:1 scale-down operation, in accordance with an embodiment of the invention. Referring to FIGS. 13A-13B, there are shown a signal 1302 and a signal 1304, with frequency normalized to the Nyquist frequency, that correspond to the amplitude and phase responses respectively of a 2-phase-6-tap PPF utilized for 4:1 down scaling operations. The symmetric PPF filtering coefficients utilized in this example are [29 61 76]/256 and [14 44 70]/256. The response shown indicates some degree of aliasing.

The horizontal scalers shown in FIGS. 5A, 5B, 7A, and 7B may also be implemented utilizing a 2-phase-8-tap PPF with symmetric in-phase and out-of-phase filtering and 8-sub-phase interpolation. In this regard, the use of a 2-phase-8-tap PPF implementation or a 2-phase-6-tap PPF implementation may depend, for example, on system specifications and requirements.

Figure 14A:
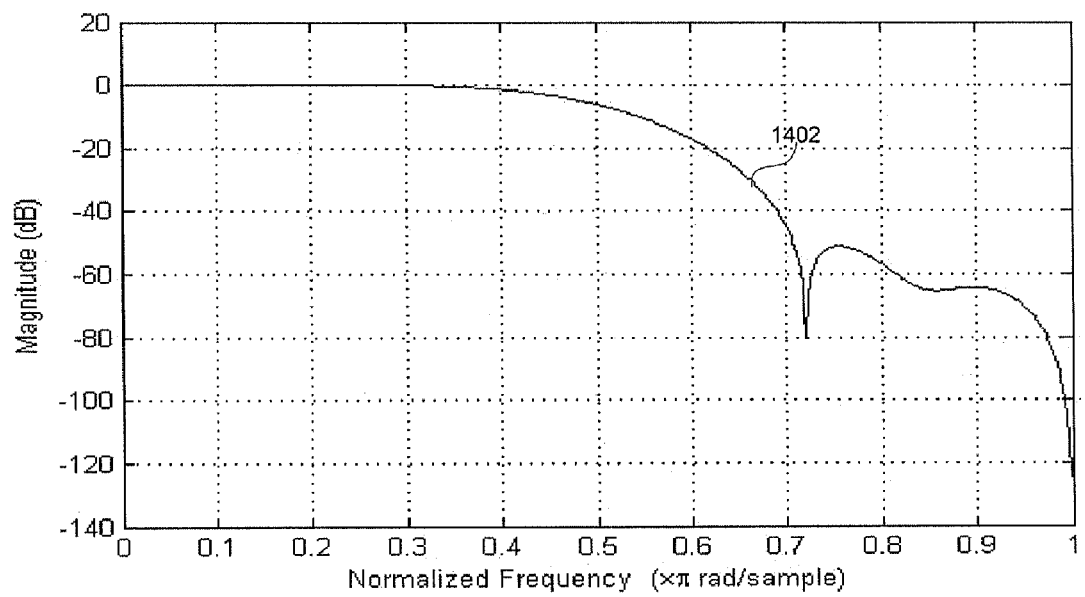
FIGS. 14A-14B illustrate exemplary magnitude and phase filter responses for an 8-tap-2-phase filter video scale-up operation, in accordance with an embodiment of the invention.
Figure 14B:
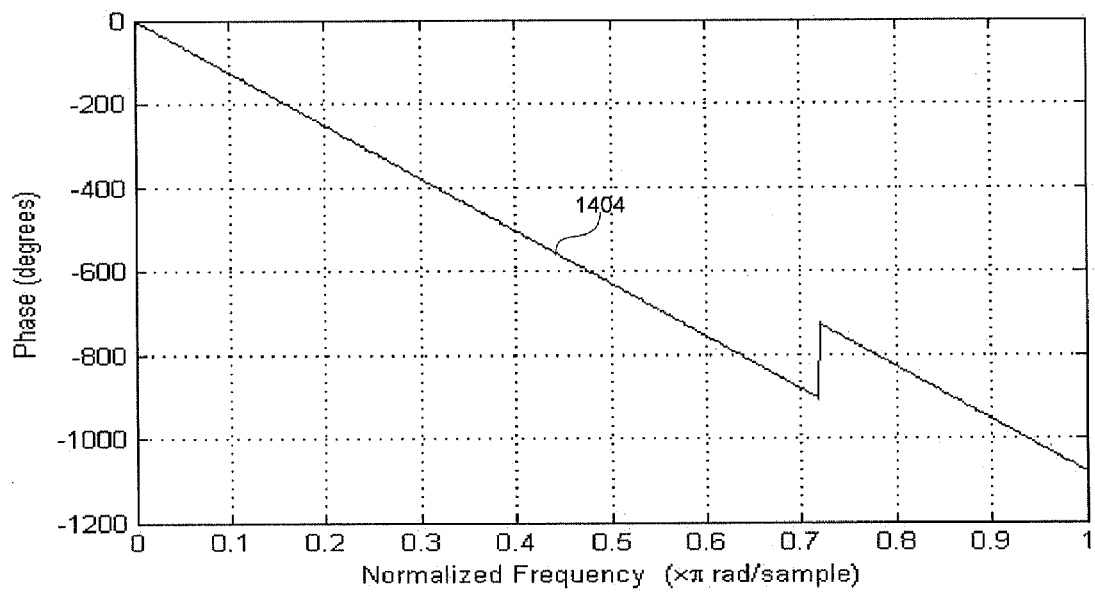

FIGS. 14A-14B illustrate exemplary magnitude and phase filter responses for an 8-tap-2-phase filter video scale-up operation, in accordance with an embodiment of the invention. Referring to FIGS. 14A-14B, there are shown a signal 1402 and a signal 1404, with frequency normalized to the Nyquist frequency, that correspond to the amplitude and phase responses respectively of a 2-phase-8-tap PPF utilized for up scaling operations. The PPF filtering coefficients utilized in this example are [0 0 0 256 0 0 0 0]/256 and [−2 11 −38 157 157 −38 11 −2]/256.

Figure 15A:
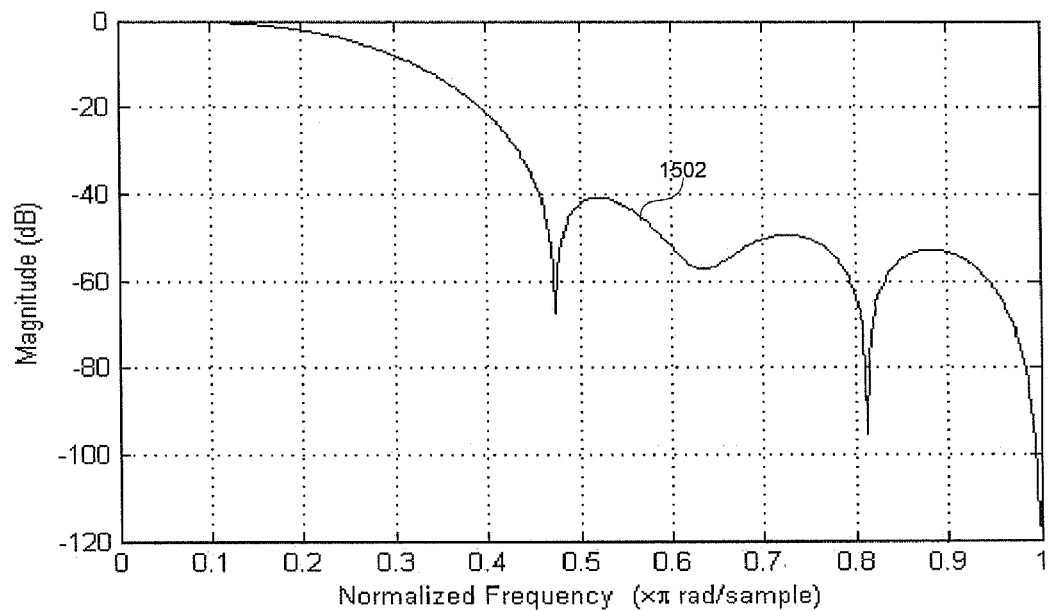
FIGS. 15A-15B illustrate exemplary magnitude and phase filter responses for an 8-tap-2-phase filter video 16:9 scale-down operation, in accordance with an embodiment of the invention.
Figure 15B:
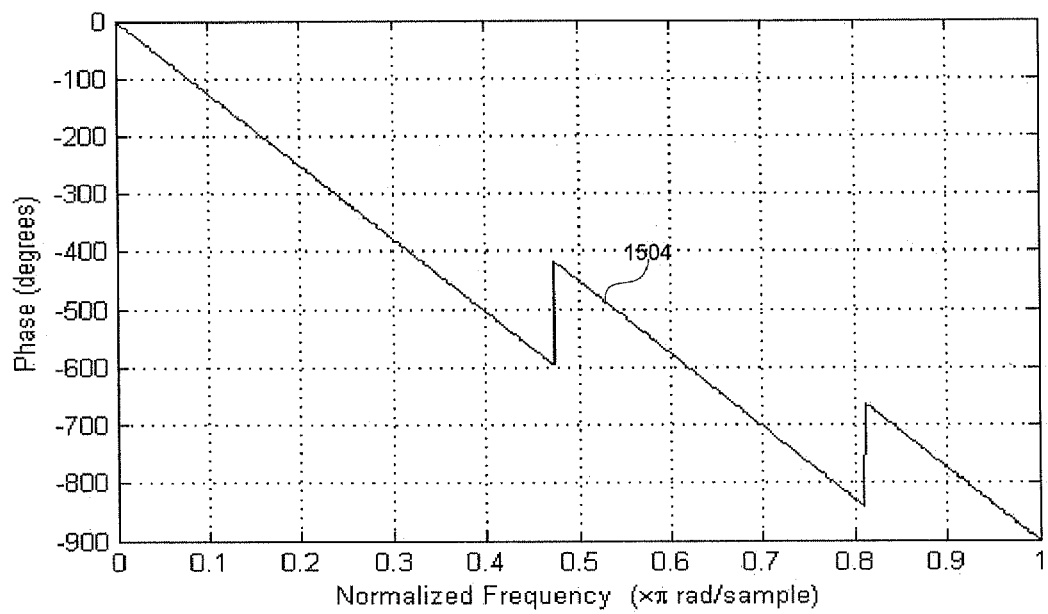

FIGS. 15A-15B illustrate exemplary magnitude and phase filter responses for an 8-tap-2-phase filter video 16:9 scale-down operation, in accordance with an embodiment of the invention. Referring to FIGS. 15A-15B, there are shown a signal 1502 and a signal 1504, with frequency normalized to the Nyquist frequency, that correspond to the amplitude and phase responses respectively of a 2-phase-8-tap PPF utilized for 16:9 down scaling operations. The PPF filtering coefficients utilized in this example are [−4 −7 69 140 69 −7 −4 0]/256 and [0 −10 19 119 119 19 −10 0]/256.

Figure 16A:
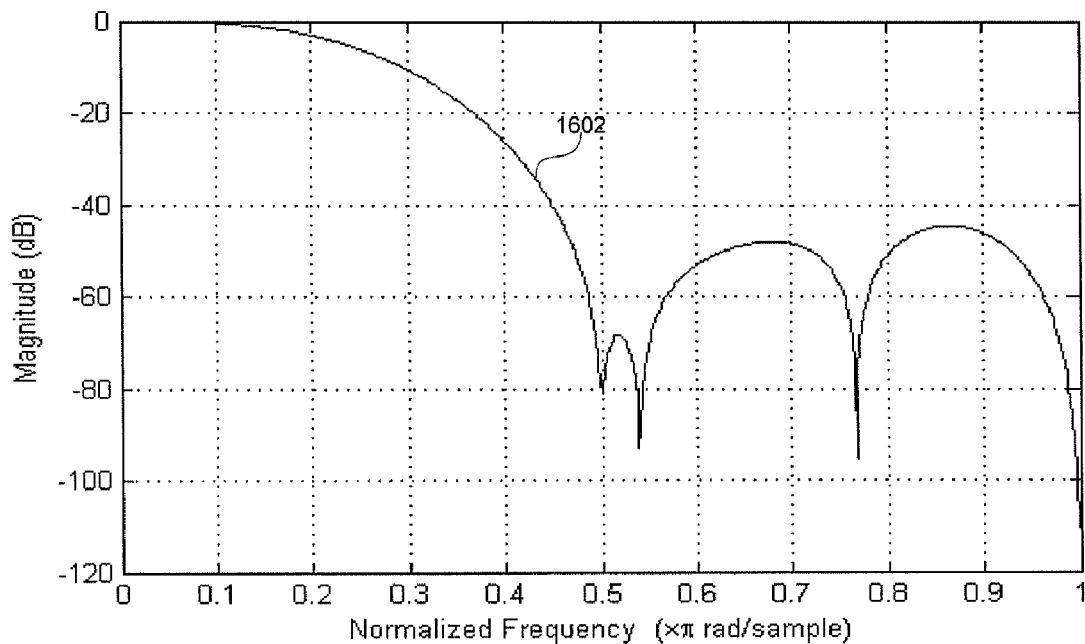
FIGS. 16A-16B illustrate exemplary magnitude and phase filter responses for an 8-tap-2-phase filter video 2:1 scale-down operation, in accordance with an embodiment of the invention.
Figure 16B:
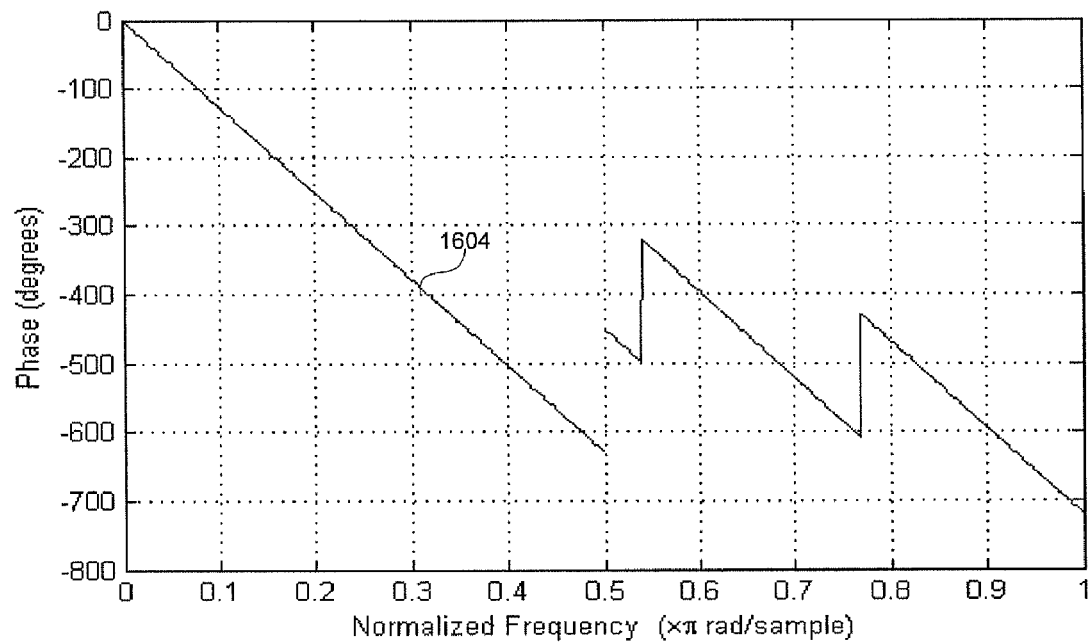

FIGS. 16A-16B illustrate exemplary magnitude and phase filter responses for an 8-tap-2-phase filter video 2:1 scale-down operation, in accordance with an embodiment of the invention. Referring to FIGS. 16A-16B, there are shown a signal 1602 and a signal 1604, with frequency normalized to the Nyquist frequency, that correspond to the amplitude and phase responses respectively of a 2-phase-8-tap PPF utilized for 2:1 down scaling operations. The PPF filtering coefficients utilized in this example are [−5 0 69 128 69 0 −5 0]/256 and [−2 −8 27 111 111 27 −8 −2]/256.

Figure 17A:
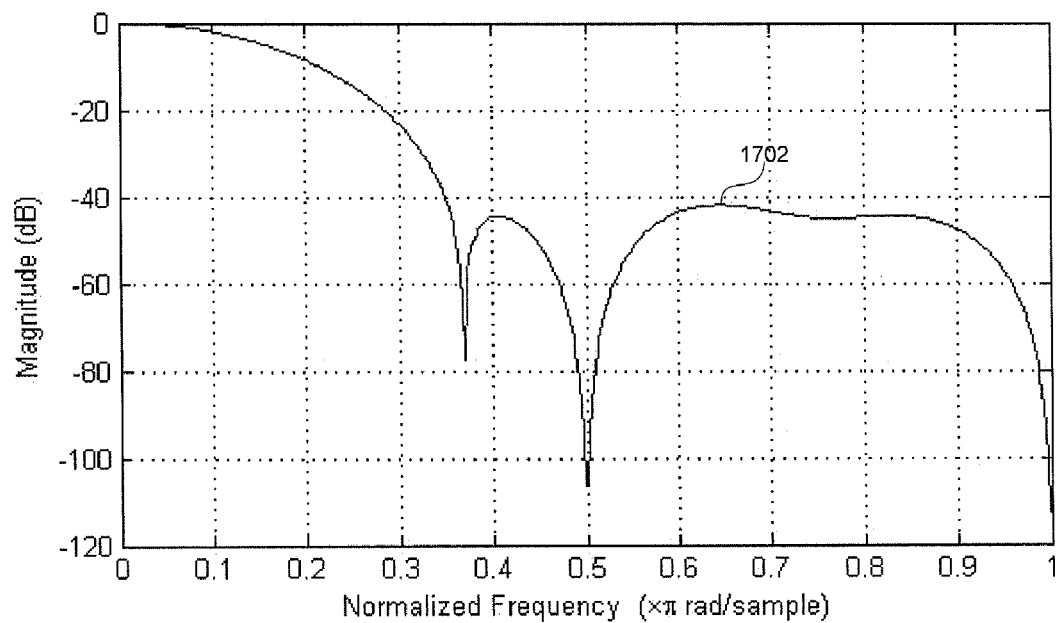
FIGS. 17A-17B illustrate exemplary magnitude and phase filter responses for an 8-tap-2-phase filter video 3:1 scale-down operation, in accordance with an embodiment of the invention.
Figure 17B:
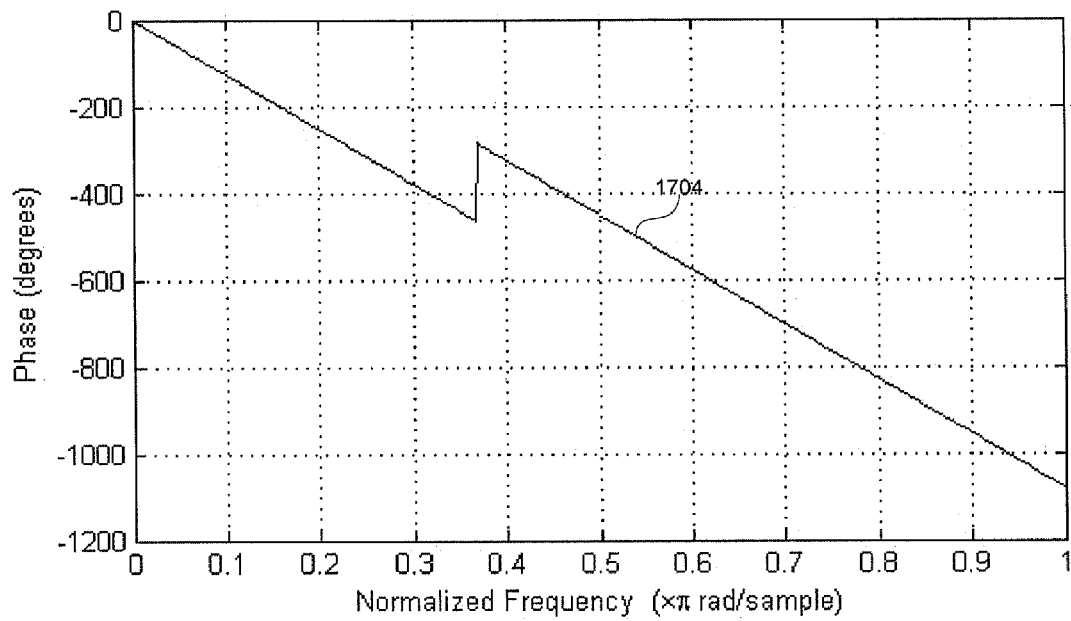

FIGS. 17A-17B illustrate exemplary magnitude and phase filter responses for an 8-tap-2-phase filter video 3:1 scale-down operation, in accordance with an embodiment of the invention. Referring to FIGS. 17A-17B, there are shown a signal 1702 and a signal 1704, with frequency normalized to the Nyquist frequency, that correspond to the amplitude and phase responses respectively of a 2-phase-8-tap PPF utilized for 3:1 down scaling operations. The PPF filtering coefficients utilized in this example are [0 20 64 88 64 20 0 0]/256 and [−1 6 40 83 83 40 6 −1]/256.

The algorithms and/or architectures described herein for video scalers may resolve at least some of the problems associated with loss of scaling quality and its associated undesirable visible effects when video scalers utilize smaller hardware implementations.

Accordingly, the present invention may be realized in hardware, software, or a combination thereof. The present invention may be realized in a centralized fashion in at least one computer system, or in a distributed fashion where different elements may be spread across several interconnected computer systems. Any kind of computer system or other apparatus adapted for carrying out the methods described herein may be suited. A typical combination of hardware and software may be a general-purpose computer system with a computer program that, when being loaded and executed, may control the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing video information, the method comprising:
   generating a scaled video image from an input video image using a two-phase polyphase filter, said generating comprising:

filtering said input video image to generate a first sub-filtering output and a second sub-filtering output; and
interpolating said first sub-filtering output and said second sub-filtering output.

2. The method according to claim 1, comprising generating said first sub-filtering output and said second sub-filtering output in parallel.

3. The method according to claim 1, comprising interpolating said first sub-filtering output and said second sub-filtering output based on a scaling factor.

4. The method according to claim 1, comprising generating at least one signal that schedules and controls said interpolation.

5. The method according to claim 1, comprising generating at least one signal that schedules said filtering of said input video image.

6. The method according to claim 1, comprising generating said first sub-filtering output using zero-phase filtering.

7. The method according to claim 1, comprising generating said second sub-filtering output using out-of-phase filtering.

8. A non-transitory computer readable medium having stored thereon, a computer program having at least one code for processing video information, the at least one code section being executable by a computer for causing the computer to perform steps comprising:
generating a scaled video image from an input video image using a two-phase polyphase filter, said generating comprising:
filtering said input video image to generate a first sub-filtering output and a second sub-filtering output; and
interpolating said first sub-filtering output and said second sub-filtering output.

9. The non-transitory computer readable medium according to claim 8, wherein said at least one code section comprises code for generating said first sub-filtering output and said second sub-filtering output in parallel.

10. The non-transitory computer readable medium according to claim 8, wherein said interpolation is based on a scaling factor.

11. The non-transitory computer readable medium according to claim 8, wherein said at least one code section comprises code for generating at least one signal that schedules said interpolation.

12. The non-transitory computer readable medium according to claim 8, wherein said at least one code section comprises code for generating at least one signal that schedules and controls said filtering of said input video image.

13. The non-transitory computer readable medium according to claim 8, wherein said at least one code section comprises code for generating said first sub-filtering output using zero-phase filtering.

14. The non-transitory computer readable medium according to claim 8, wherein said at least one code section comprises code for said second sub-filtering using out-of-phase filtering.

15. A system for processing video information, the system comprising:
one or more processors and/or circuits comprising a two-phase polyphase filter, said two-phase polyphase filter comprising an interpolator, said two-phase polyphase filter being operable to generate a scaled video image from an input video image; wherein for said generation, said one or more processors and/or circuits are operable to:
filter said input video image to generate a first sub-filtering output and a second sub-filtering output; and
interpolate, using said interpolator, said first sub-filtering and said second sub-filtering output.

16. The system according to claim 15, wherein said one or more processors and/or circuits are operable to generate said first sub-filtering output and said second sub-filtering output in parallel.

17. The system according to claim 15, wherein said interpolator is operable to interpolate said first sub-filtering output and said second sub-filtering output based on a scaling factor.

18. The system according to claim 15, wherein said one or more processors and/or circuits comprise a scheduler, said scheduler being operable to generate at least one signal that schedules and controls said interpolation.

19. The system according to claim 15, wherein said one or more processors and/or circuits comprise a scheduler, said-scheduler being operable to generate at least one signal that schedules said filtering of said input video image.

20. The system according to claim 15, wherein said one or more processors and/or circuits are operable to generate said first sub-filtering output using zero-phase filtering.

21. The system according to claim 15, wherein said one or more processors and/or circuits are operable to generate said second sub-filtering output using out-of-phase filtering.

\* \* \* \* \*